United States Patent [19]
Yoshida et al.

[11] Patent Number: 5,703,698
[45] Date of Patent: Dec. 30, 1997

[54] APPARATUS AND METHOD FOR FACSIMILE TRANSMISSION OF SYNTHESIZED IMAGES

[75] Inventors: Takehiro Yoshida, Tokyo; Shin Tsuda, Yokohama, both of Japan

[73] Assignee: Canon Kabushiki Kaisha, Tokyo, Japan

[21] Appl. No.: 444,724

[22] Filed: May 19, 1995

Related U.S. Application Data

[63] Continuation of Ser. No. 845,159, Mar. 3, 1992, abandoned.

[30] Foreign Application Priority Data

| Mar. 4, 1991 | [JP] | Japan | 3-037422 |
| Apr. 3, 1991 | [JP] | Japan | 3-098164 |
| Oct. 17, 1991 | [JP] | Japan | 3-269424 |

[51] Int. Cl.⁶ .................................................. H04N 1/387
[52] U.S. Cl. ................................ 358/435; 358/438; 358/450
[58] Field of Search ........................... 358/444, 447–448; 434/440, 450–453, 537, 538, 540; 348/588, 589; 382/284; H04N 1/387

[56] References Cited

U.S. PATENT DOCUMENTS

| 4,672,459 | 6/1987 | Kudo | 358/452 |
| 4,729,637 | 3/1988 | Sato et al. | |
| 4,731,672 | 3/1988 | Sugishima et al. | |
| 4,843,479 | 6/1989 | Yoshino et al. | |
| 4,849,816 | 7/1989 | Yoshida | |
| 4,870,503 | 9/1989 | Miura | |
| 4,896,208 | 1/1990 | Moriya et al. | 358/452 |
| 4,956,704 | 9/1990 | Yamada | 358/80 |
| 4,996,598 | 2/1991 | Hara | 358/22 |
| 5,001,572 | 3/1991 | Hashimoto et al. | |
| 5,022,072 | 6/1991 | Sakakibara | |
| 5,034,806 | 7/1991 | Ikeda et al. | 358/75 |
| 5,058,189 | 10/1991 | Kanno | 358/183 |
| 5,291,305 | 3/1994 | Sakashita et al. | 358/444 |
| 5,396,345 | 3/1995 | Motoyama | 358/448 |
| 5,499,110 | 3/1996 | Hosogai | 358/450 |

*Primary Examiner*—Kim Vu
*Attorney, Agent, or Firm*—Fitzpatrick, Cella, Harper & Scinto

[57] ABSTRACT

An image communication apparatus includes a reader for reading an original image, a memory circuit for storing image information read by the reader, a sending unit for sending the image information, and a controller for synthesizing image information read by the reader and the image information stored in the memory circuit, and causing the sending unit to send the synthesized image information.

27 Claims, 19 Drawing Sheets

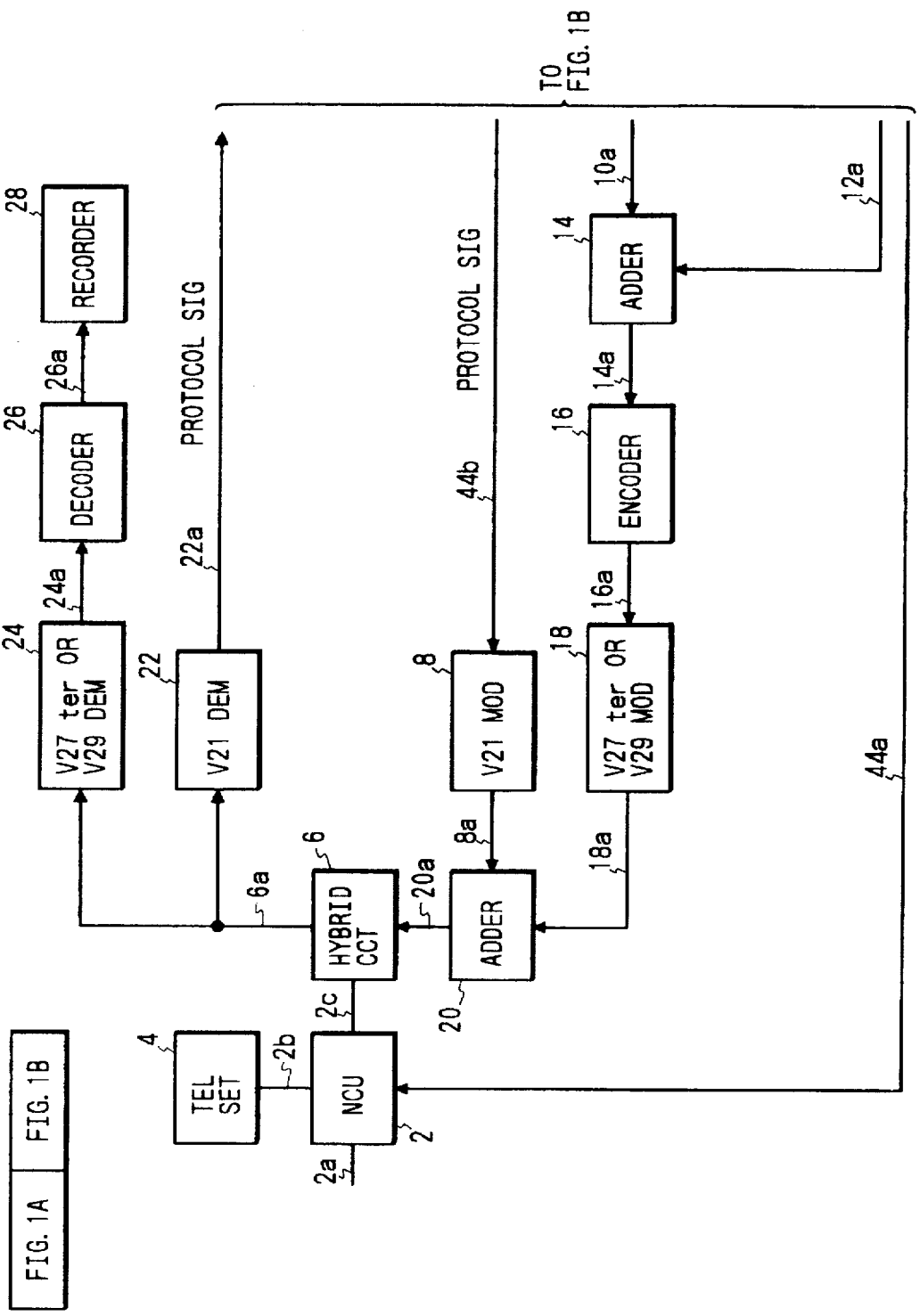

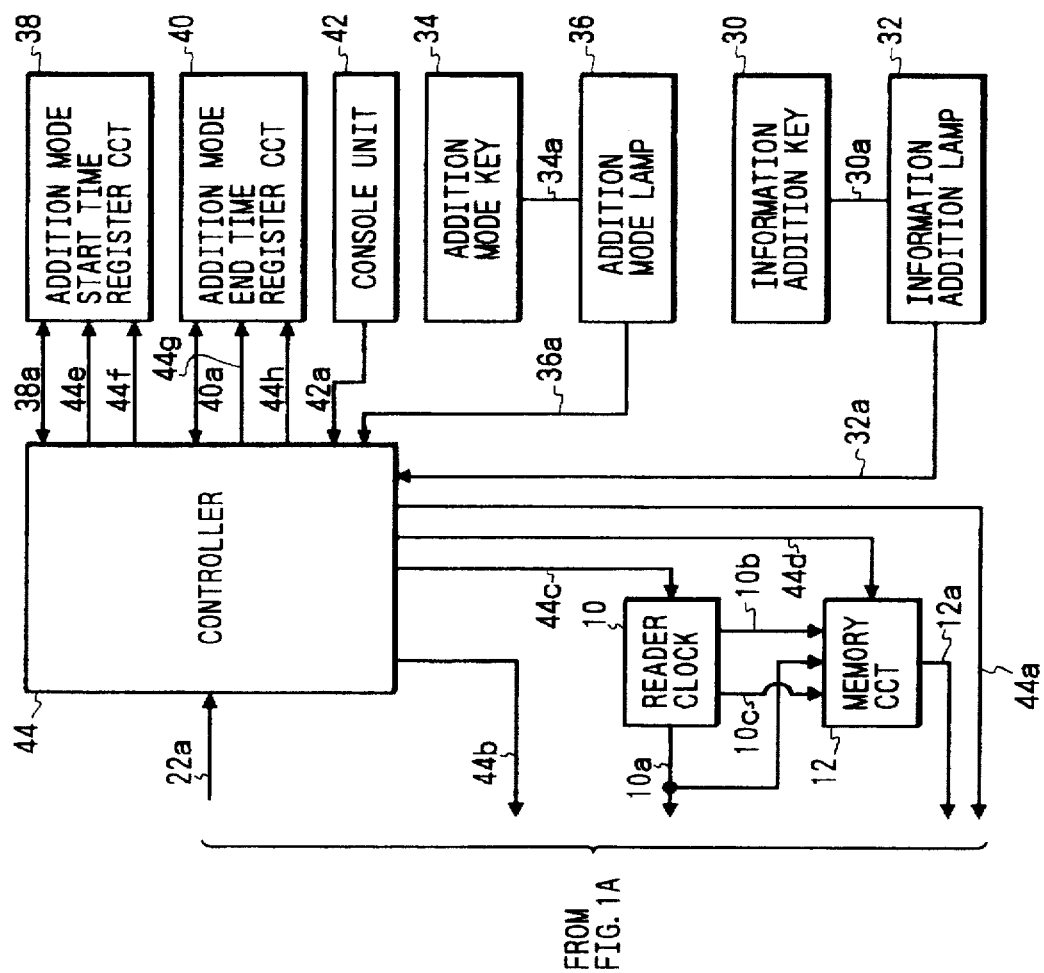

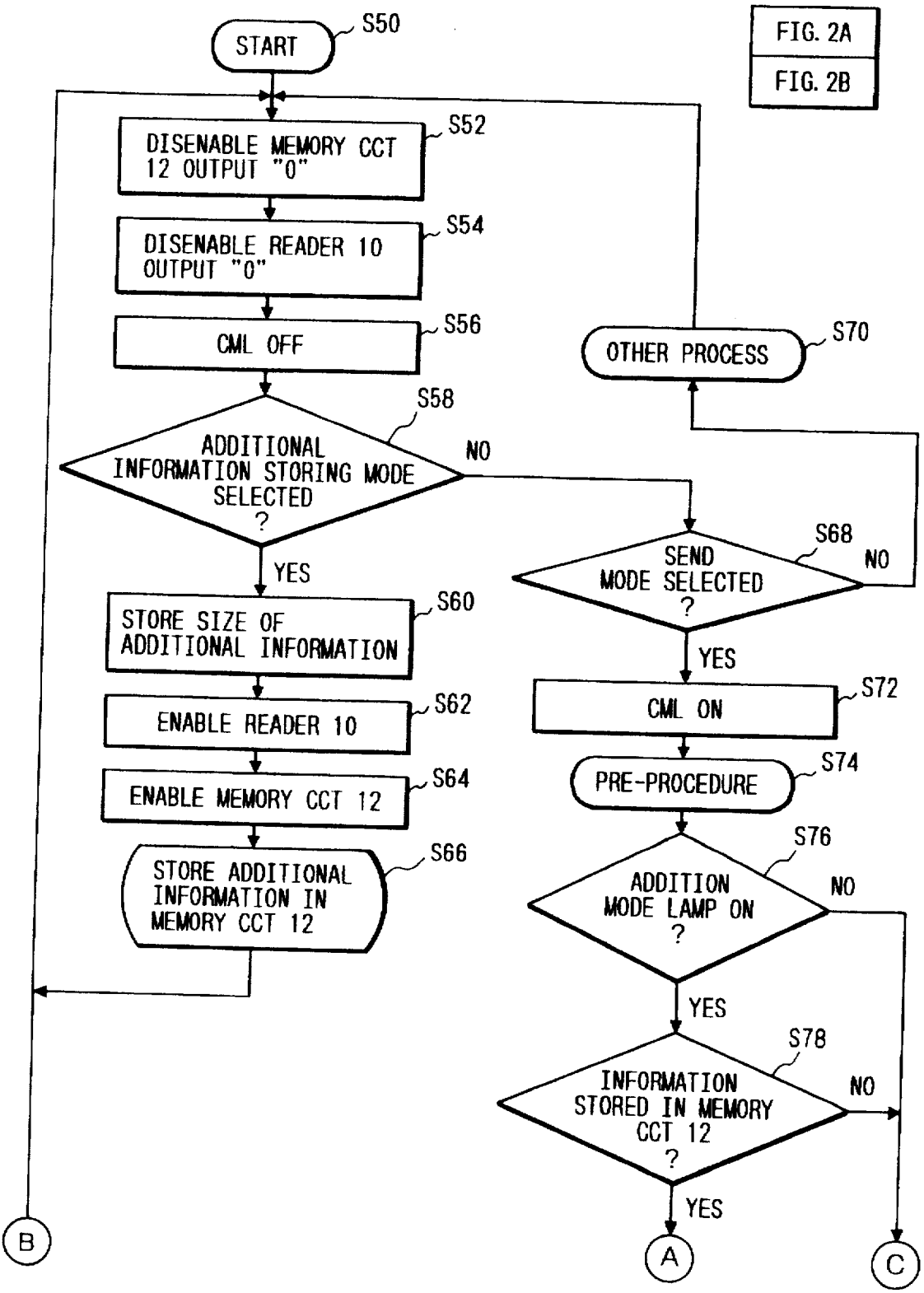

FIG. 4
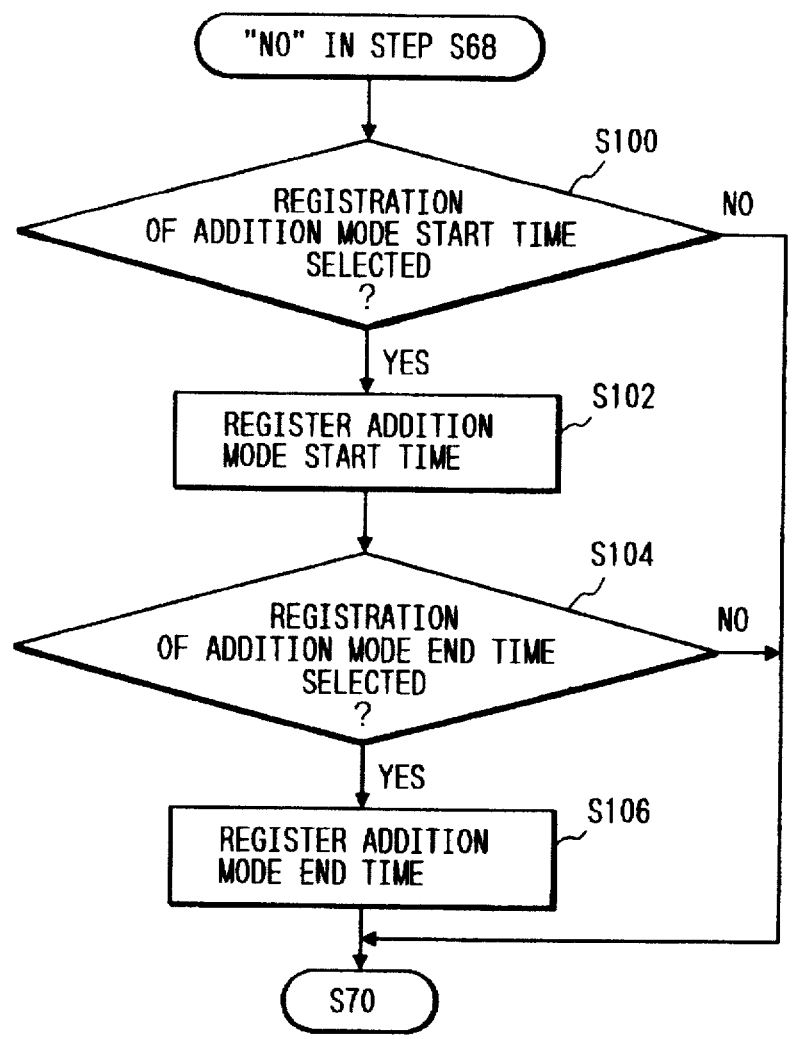
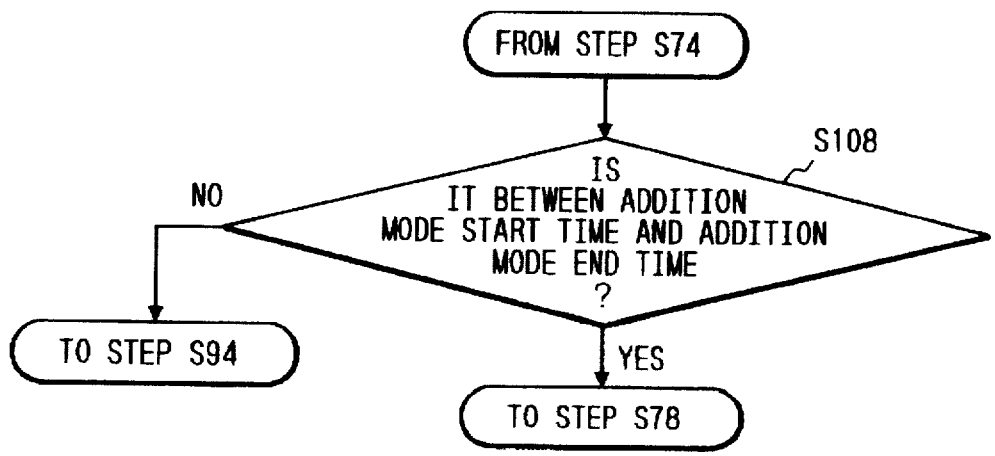

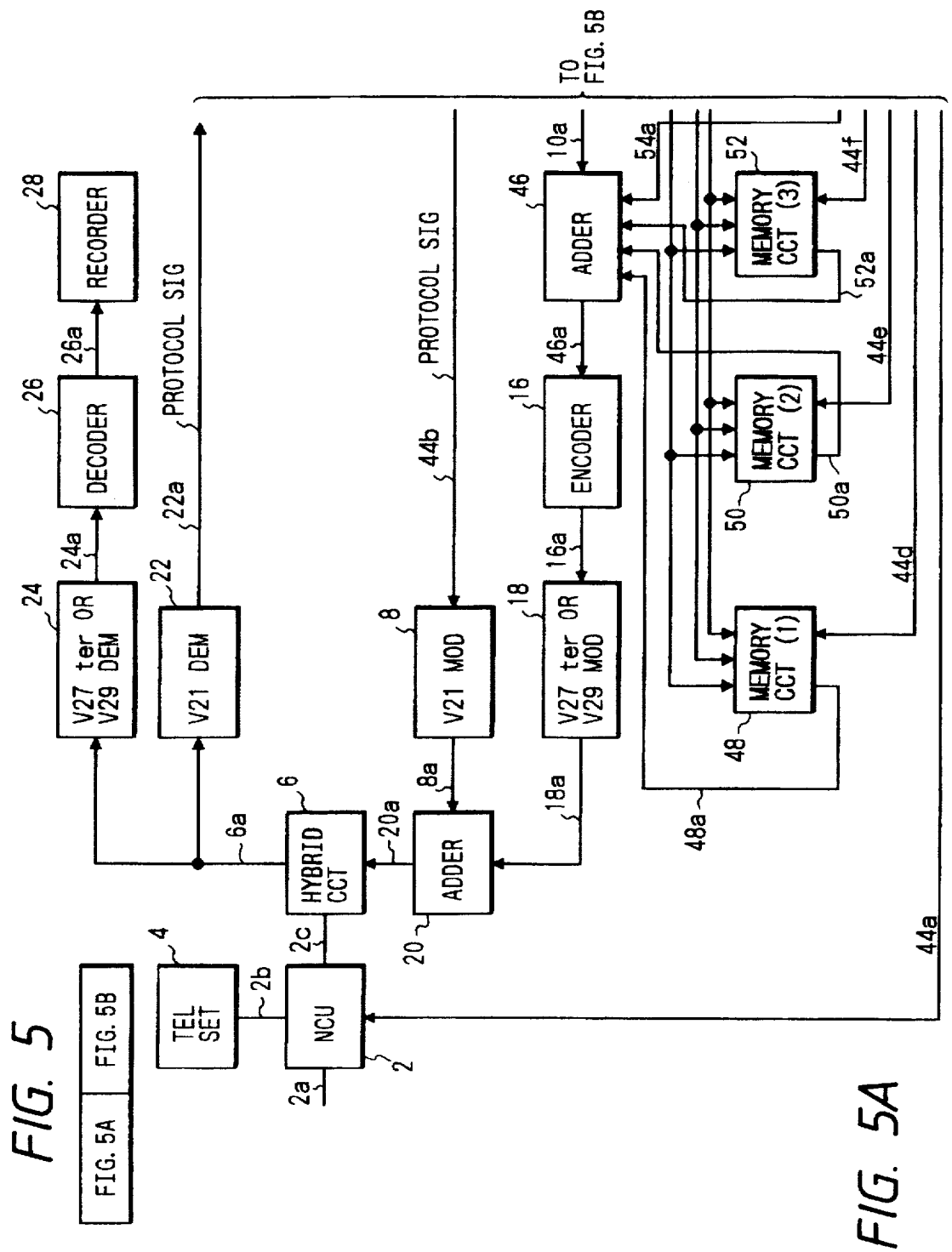

FIG. 6A
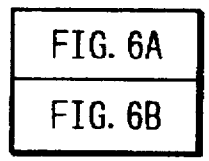
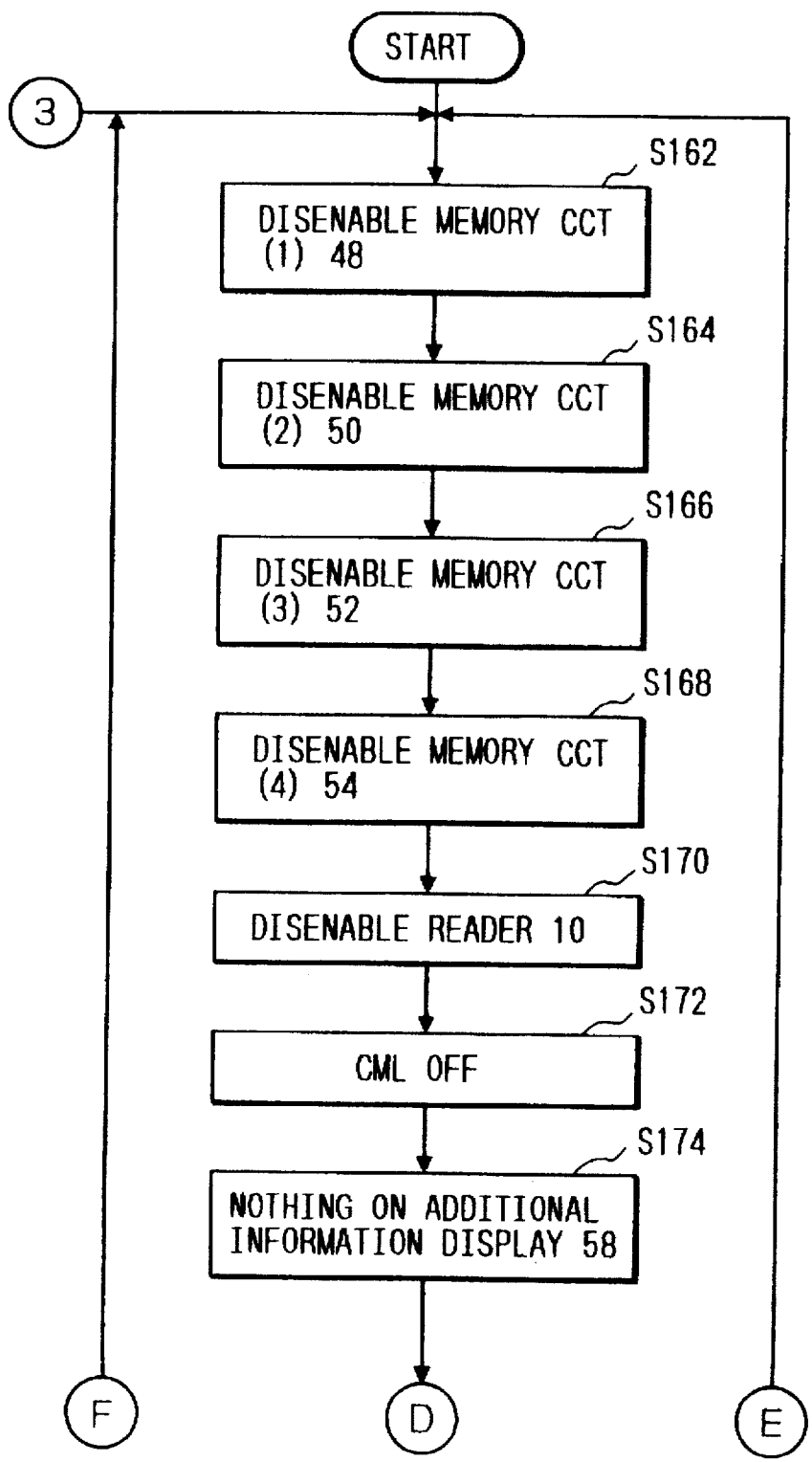

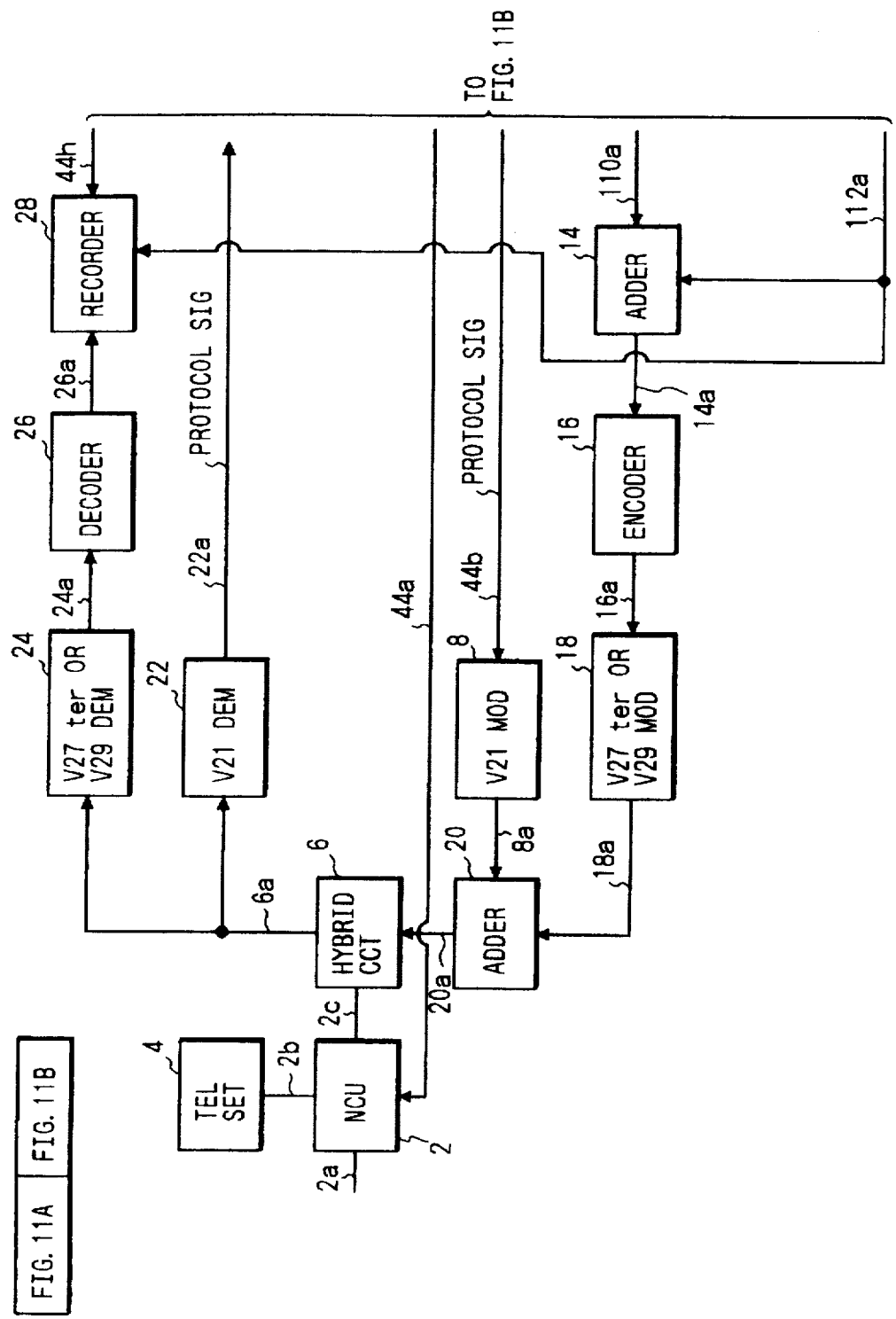

| FIG. 12A |
| FIG. 12B |

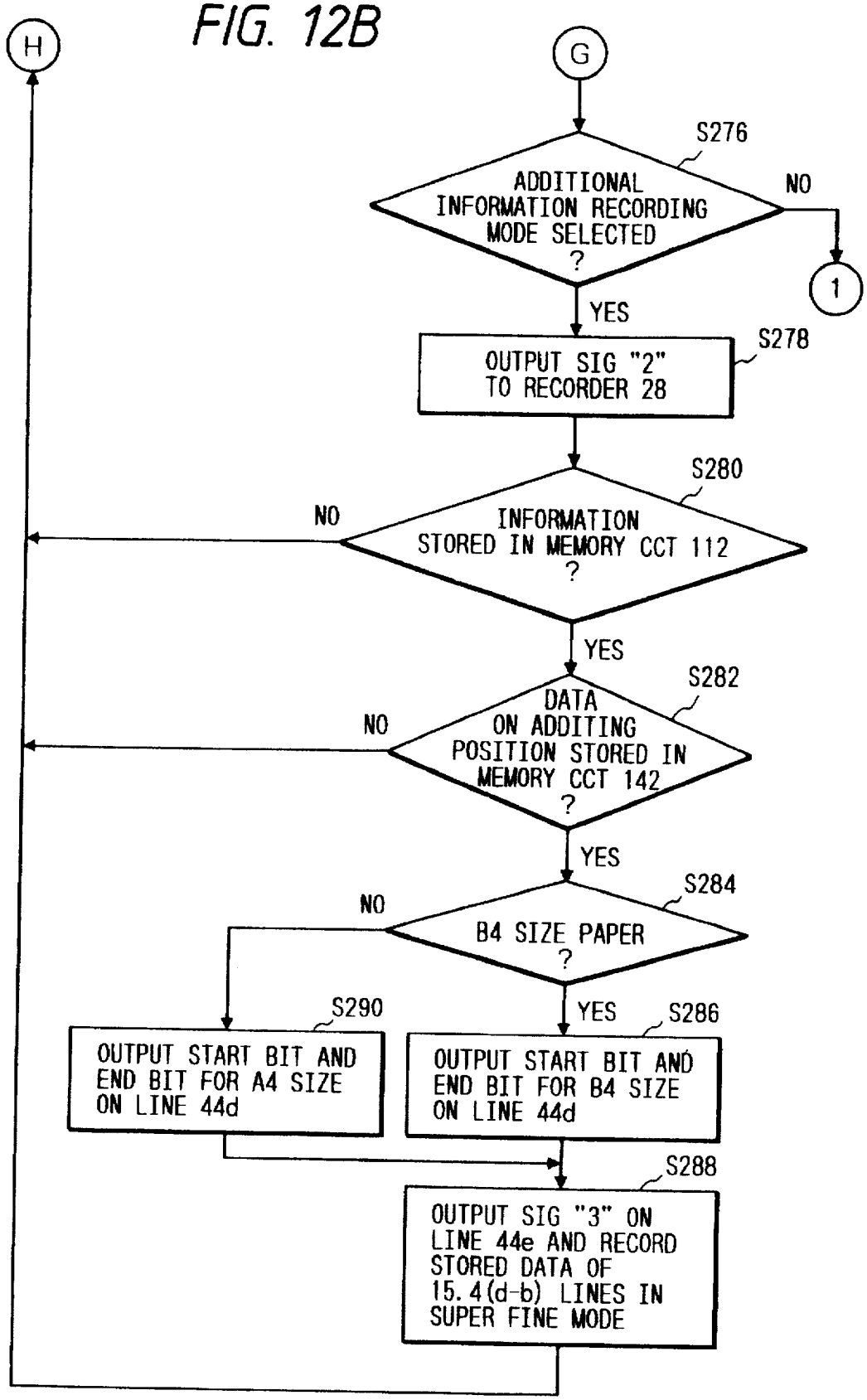

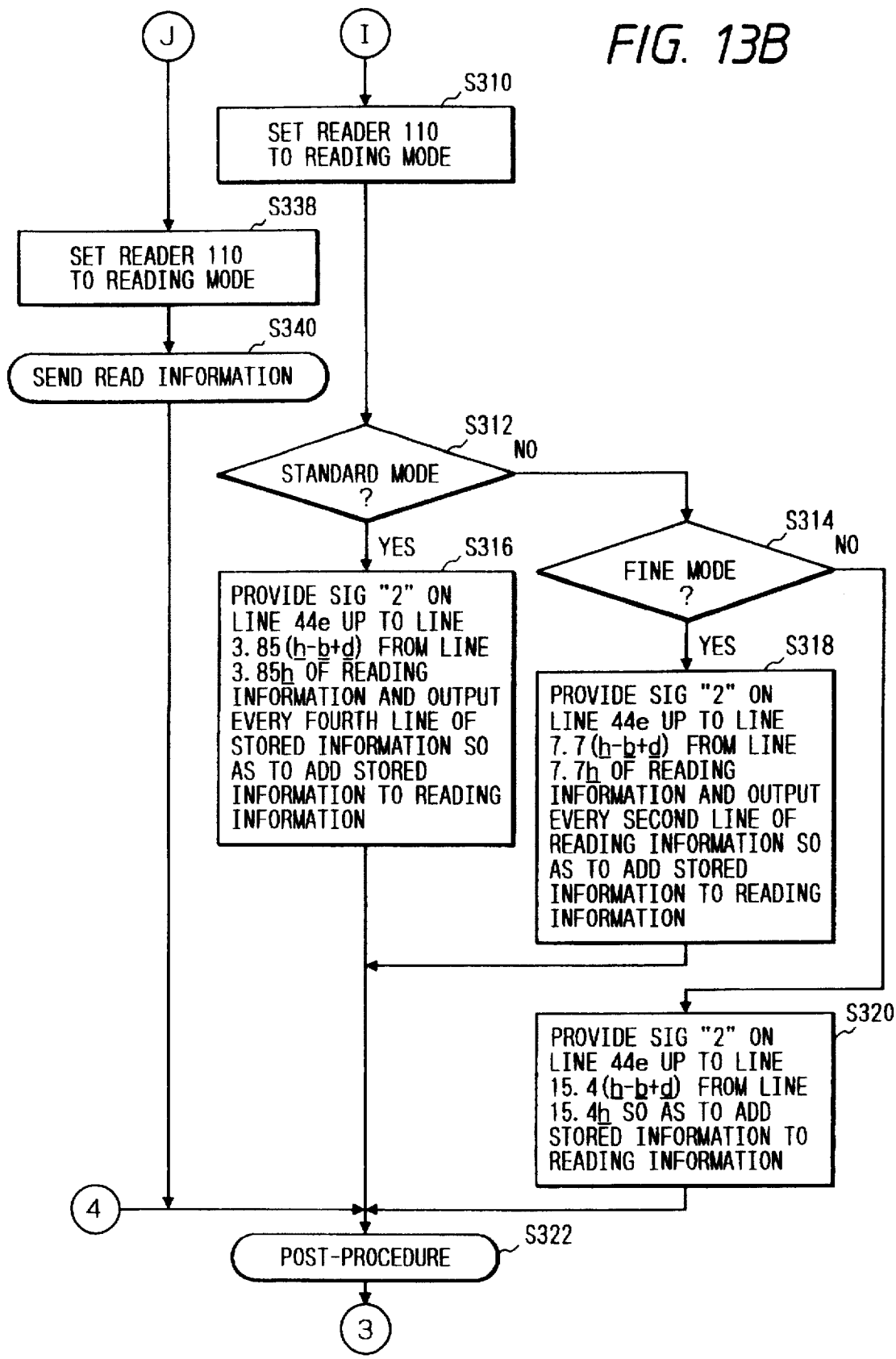

ered image every time a sending operation is performed.
APPARATUS AND METHOD FOR FACSIMILE TRANSMISSION OF SYNTHESIZED IMAGES This application is a continuation of application Ser. No. 07/845,159 filed Mar. 3, 1992.

BACKGROUND OF THE INVENTION

1. Field of the Invention

The present invention relates to an image communication apparatus and, more particularly, to an image communication apparatus having an image synthesizing function.

2. Related Background Art

As a conventional apparatus of this type, for example, a facsimile apparatus is known. A conventional facsimile apparatus sends a read original image added with sending source information (fixed character information), e.g., date information, a user's abbreviation of the self apparatus, a telephone number of the self apparatus, a user's abbreviation and a telephone number of a destination, a page number, and the like.

As an apparatus for adding sending source information, U.S. Pat. Nos. 4,843,479, 4,729,637, 4,870,503, and 5,001,572 are known.

However, the above-mentioned apparatus merely adds fixed information to an original image, and sends the image. With this apparatus, a user cannot arbitrarily set additional information, and cannot add information according to a user's favor to an original image.

Therefore, in the conventional apparatus, a user must directly add an image to an original image, or must edit an original image every time a sending operation is performed.

SUMMARY OF THE INVENTION

The present invention has been made in consideration of the conventional problems, and its object is to improve an image communication apparatus.

It is another object of the present invention to provide an image communication apparatus, wherein image information to be added to an original image is read and stored in advance, an original image and the stored image information can be synthesized by a simple operation, and the synthesized image can be sent.

It is still another object of the present invention to provide an image communication apparatus, which can synthesize additional information according to a user's favor to an original image by a simple operation, and can send the synthesized image.

Other objects of the present invention will become apparent from the following detailed description of the embodiments taken in conjunction with the accompanying drawings.

BRIEF DESCRIPTION OF THE DRAWINGS

FIG. 1, is divided into FIGS. 1A and 1B as shown, is a block diagram showing an arrangement of a facsimile apparatus according to the first embodiment of the present invention;

FIGS. 2A, 2B are flow charts showing a control operation of the first embodiment;

FIG. 4 is a flow chart showing a control operation according to a modification of the first embodiment;

FIG. 5, divided into FIGS. 5A and 5B, is a block diagram showing an arrangement of a facsimile apparatus according to the second embodiment of the present invention;

FIG. 6, divided into FIGS. 6A and 6B, is a flow chart showing a control operation of the second embodiment;

FIG. 11, divided into FIGS. 11A and 11B, is a block diagram showing an arrangement of a facsimile apparatus according to the third embodiment of the present invention; FIGS. 12 and 13 are divided into FIGS. 12A and 12B, and FIGS. 13A and 13B, respectively, are flow charts showing a control operation of the third embodiment.

DETAILED DESCRIPTION OF THE PREFERRED EMBODIMENTS

Figure 2B:
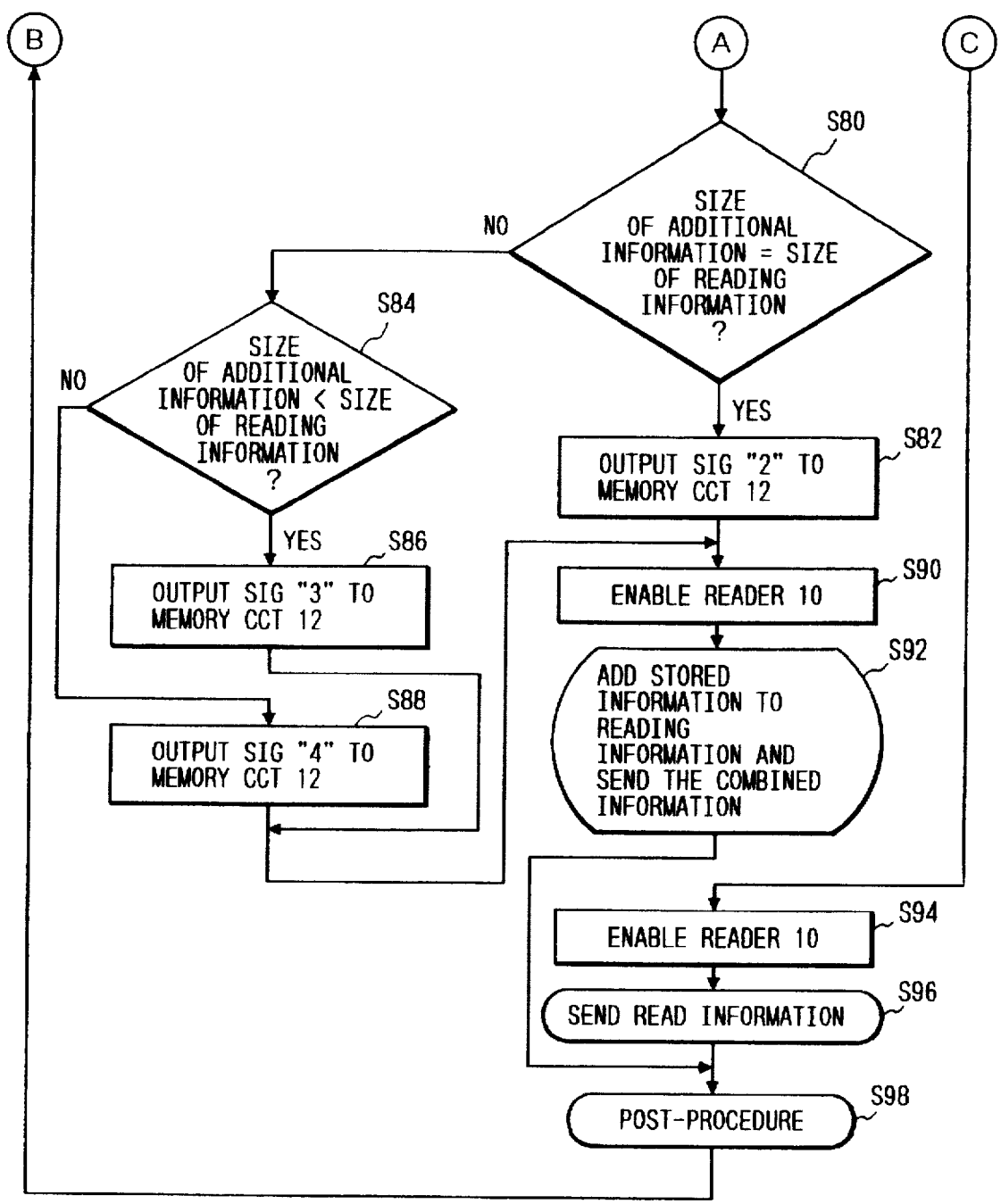

The preferred embodiments of the present invention will be described in detail hereinafter with reference to the accompanying drawings.

FIG. 1 is a block diagram showing an arrangement of a facsimile apparatus according to the first embodiment of the present invention.

In FIG. 1, a network control unit (NCU) 2 performs connection control of a telephone exchange network by connecting to a terminal of a line so as to use a telephone network in, e.g., a data communication, performs switching to a data communication channel, and holds a loop. A signal line 2a is a telephone line. If a signal received from a signal line 44a is at level "0" (low level), the NCU 2 connects the telephone line to the telephone set side, i.e., connects the signal line 2a to a signal line 2b. If a signal received from the signal line 44a is at level "1" (high level), the NCU 2 connects the telephone line to the facsimile apparatus side, i.e., connects the signal line 2a to a signal line 2c. In a normal state, the telephone line is connected to the telephone set side.

A telephone set 4 is connected to the NCU 2.

A hybrid circuit 6 separates transmission-system signals from reception-system signals. More specifically, a transmission signal on a signal line 20a passes through the signal line 2c, and is sent onto the telephone line through the NCU 2. A signal sent from a distant station is input to the NCU 2, and is then output onto a signal line 6a through the signal line 2c.

A modulator 8 performs modulation based on the known CCITT recommendation V21. The modulator 8 receives a protocol signal on a signal line 44b, modulates the signal, and outputs the modulated data onto a signal line 8a.

A reader 10 sequentially reads an image signal for one main scanning line from an original to be sent when a signal of signal level "1" is output onto a signal line 44c, and forms a signal string representing binary values, i.e., "black" and "white". The reader 10 comprises an image pickup device such as a CCD (charge-coupled device), and an optical system. The binary signal string representing "black" and "white" is output onto a signal line 10a. The reader 10 outputs a data transfer clock onto a signal line 10b when it outputs reading data onto the signal line 10a. The reader 10 generates a line pulse onto a signal line 10c prior to transfer of one-line reading data.

A memory circuit 12 is disabled when a signal of a signal value "0" is output onto a signal line 44d. When a signal of a signal value "1" is output onto the signal line 44d, the memory circuit 12 sequentially stores line information output onto the signal line 10a on the basis of the line pulse information output onto the signal line 10c in synchronism with the data transfer clocks output onto the signal line 10b. When a signal of a signal value "2" is output onto the signal line 44d, the memory circuit 12 sequentially outputs the stored line information onto a signal line 12a on the basis of the line pulse information output onto the signal line 10c in synchronism with the data transfer clocks output onto the signal line 10b (an A4 storing/A4 reading mode, or a B4 storing/B4 reading mode). When a signal of a signal value "3" is output onto the signal line 44d, the memory circuit 12 sequentially outputs the stored line information onto the signal line 12a on the basis of the line pulse information output onto the signal line 10c in synchronism with the 161st and subsequent clocks of the data transfer clocks output onto the signal line 10b (an A4 storing/B4 reading mode). When a signal of a signal value "4" is output onto the signal line 44d, the memory circuit 12 sequentially outputs information corresponding to 161st and subsequent dots of the line information stored in the memory circuit 12 onto the signal line 12a on the basis of the line pulse information output onto the signal line 10c in synchronism with the data transfer clocks output onto the signal line 10b (a B4 storing/A4 reading mode).

An adder 14 receives signals output onto the signal lines 10a and 12a, and outputs a sum of these signals onto a signal line 14a.

An encoder 16 receives data output onto the signal line 14a, and outputs encoded data (by, e.g., MH (modified Huffman) coding, or MR (modified READ) coding) onto a signal line 16a.

A modulator 18 performs modulation on the basis of the known CCITT recommendation V27ter (differential phase modulation) or V29 (orthogonal modulation). The modulator 18 receives a signal on the signal line 16a, modulates the signal, and outputs the modulated data onto a signal line 18a.

An adder 20 receives signals on the signal lines 8a and 18a, and outputs a sum of the two signals onto a signal line 20a.

A demodulator 22 performs demodulation based on the known CCITT recommendation V21. The demodulator 22 receives a signal on the signal line 6a, performs V21 demodulation, and outputs demodulated data onto a signal line 22a.

A demodulator 24 performs demodulation based on the known CCITT recommendation V27ter (differential phase modulation) or V29 (orthogonal modulation). The demodulator 24 receives a signal on the signal line 6a, demodulates the signal, and outputs the demodulated data onto a signal line 24a.

A decoder 26 receives a signal on the signal line 24a, and outputs decoded data (by, e.g., MH (modified Huffman) decoding, or MR (modified READ) decoding) onto a signal line 26a.

A recorder 28 receives a signal output onto the signal line 26a, and sequentially performs recording line by line.

An information addition button 30 is used when information to be added to reading information is stored in the memory circuit 12. Upon depression of the button 30, a pulse is generated onto a signal line 30a.

An information addition lamp 32 is turned off when a power switch is switched from an ON state to an OFF state. Every time a pulse is generated onto the signal line 30a, the information addition lamp 32 is repetitively turned on, off, and on. When the information addition lamp 32 is OFF, it outputs a signal of signal level "0" onto a signal line 32a; when the lamp 32 is ON, it outputs a signal of signal level "1" onto the signal line 32a.

An addition mode button 34 is used when the sum of information stored in the memory circuit 12 and reading information is sent. Upon depression of the button 34, a pulse is generated onto a signal line 34a.

An addition mode lamp 36 is turned off when a power switch is switched from an ON state to an OFF state. Every time a pulse is generated onto the signal line 34a, the addition mode lamp 36 is repetitively turned on, off, and on. When the addition mode lamp 36 is OFF, it outputs a signal of signal level "0" onto a signal line 36a; when the lamp 36 is ON, it outputs a signal of signal level "1" onto the signal line 36a.

An addition mode start time register circuit 38 is used for registering an addition mode start time. When a start time is registered, a time (e.g., 18:00) is output onto a signal line 38a, and thereafter, a write pulse is generated onto a signal line 44e. When the stored time is read out, a read pulse is generated onto a signal line 44f. Thus, the stored time is output onto the signal line 38a.

An addition mode end time register circuit 40 is used for registering an addition mode end time. When an end time is registered, a time (e.g., 8:00) is output onto a signal line 40a, and thereafter, a write pulse is generated onto a signal line 44g. When the stored time is read out, a read pulse is generated onto a signal line 44h. Thus, the stored time is output onto the signal line 40a.

A console unit 42 outputs information corresponding to a depressed one of a ten-key pad, one-touch dial keys, abbreviated dial keys, an addition mode start time register key, an addition mode end time register key, and the like, onto a signal line 42a.

A controller 44 mainly performs the following control operations, and comprises a microcomputer, a ROM, a RAM, and the like.

When information to be added to reading information is stored in the memory circuit, the information addition button 30 is depressed to turn on the information addition lamp 32. After additional information is set on an original table, a start button (arranged on the console unit 42) is depressed. Then, the additional information set on the original table is read by the reader 10, and is stored in the memory circuit 12.

A user selects an addition mode by depressing the addition mode button 34. When the addition mode lamp 36 is ON upon selection of a sending operation, the sum of the stored information and reading information is sent. When the addition mode lamp 36 is OFF upon selection of a sending operation, only the reading information is sent.

FIG. 2 is a flow chart showing the control operation of the controller 44 shown in FIG. 1.

In FIG. 2, the controller 44 starts a control operation in step S50.

In step S52, the controller outputs a signal of a signal value "0" onto the signal line 44d to disable the memory circuit 12.

In step S54, the controller outputs a signal of signal level "0" onto the signal line 44c to disable the reader 10.

In step S56, the controller outputs a signal of signal level "0" onto the signal line 44a to disable a CML. Upon completion of the initialization operations in steps S52 to S56, the flow advances to step S58.

In step S58, it is checked if an additional information storing mode in the memory circuit 12 is selected. The storing mode is selected when an operator sets additional information in an ON state of the information addition lamp 32, and depresses the start button. If it is determined that the additional information storing mode in the memory circuit 12 is selected, the flow advances to step S60; otherwise, the flow advances to step S68. In this embodiment, the storing mode for storing information to be added to the reading information in the memory circuit 12 assumes one page of image. When a plurality of original images are sent, the stored information is added to all the reading information, and the sum information is sent. In this embodiment, each of additional information and reading information includes two types of sizes, i.e., A4 and B4 sizes. However, the present invention is not limited to these two types of sizes. When the flow advances from step S58 to step S60, an additional information size currently set on the original table is detected, and the detected size information is stored in the RAM.

In step S62, the controller outputs a signal of signal level "1" onto the signal line 44c to enable the reading operation of the reader 10. In step S64, the controller outputs a signal of a signal value "1" onto the signal line 44d to enable the storing operation of the memory circuit 12.

In step S66, information of an original set on the original table is read, and is stored in the memory circuit 12. Upon completion of the storage operation in the memory circuit 12, the flow returns to step S52.

When the flow advances from step S58 to step S68, it is checked if a send mode is selected. If it is determined that the send mode is selected, the flow advances to step S72; otherwise, other processes are performed in step S70, and thereafter, the flow returns to step S52.

When the flow advances from step S68 to step S72, the controller outputs a signal of signal level "1" onto the signal line 44a to turn on the CML as a relay of the NCU 2. In step S74, a pre-procedure of a facsimile communication is executed, and in step S76, it is checked if the addition mode lamp 36 is ON, i.e., if a signal of signal level "1" is output onto the signal line 36a. If it is determined that the addition mode lamp 36 is ON, the flow advances to step S78; otherwise, the flow advances to step S94.

In step S78, it is checked if information to be added is stored in the memory circuit 12. If it is determined that the information to be added is stored in the memory circuit 12, the flow advances to step S80; otherwise, the flow advances to step S94.

In steps S80 to S88, if it is determined that an (A4, A4) or (B4, B4) mode is selected based on the reading information size, and the additional information size stored in step S60, the controller outputs a signal of a signal value "2" to the memory circuit 12; if a (B4, A4) mode is selected, the controller outputs a signal of a signal value "3" to the memory circuit 12; and if an (A4, B4) mode is selected, the controller outputs a signal of a signal value "4" to the memory circuit 12, thus setting the memory circuit 12.

In step S90, the controller outputs a signal of signal level "1" onto the signal line 44c to enable the reading operation of the reader 10.

In step S92, the controller causes the reader 10 to read an original image, and causes the adder 14 to add the information stored in the memory circuit 12 to the reading image, thus sending the sum information. In this manner, upon completion of the image sending operation, a post-procedure of a facsimile communication is executed in step S98, and the flow then returns to step S52.

When the flow advances from step S76 or S78 to step S94, the controller outputs a signal of signal level "1" onto the signal line 44c to enable the reading operation of the reader 10, and performs a normal reading/sending operation in step S96. In this case, sending source information is added to an original image, and the sum image is sent. Upon completion of the image sending operation, the post-procedure is executed in step S98. Note that the sending source information is stored in the RAM of the controller 44.

Figure 3:
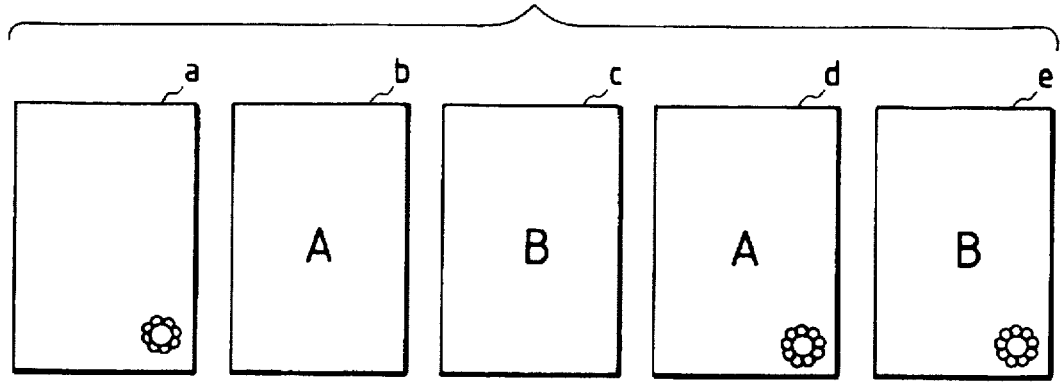
FIG. 3 is a view showing an image synthesizing operation according to the first embodiment.

FIG. 3 shows examples of image synthesis according to this embodiment. An image a is additional information stored in the memory circuit 12, and a flower is written. Images b and c are first and second pieces of reading information. The images b and c are added to the image a, and corresponding pieces of information to be sent are d and e.

In the above embodiment, when the addition mode button 34 is depressed to turn on the addition mode lamp 36, a synthesis sending operation of a reading image and a stored image is performed under a condition that image information is stored in the memory circuit 12. However, the addition mode may be cleared upon completion of each communication, and every time the addition mode is selected, the addition mode button 34 may be depressed. Alternatively, once the addition mode button 34 is depressed, the addition mode may be held unless an operator performs a mode ending operation.

Furthermore, when the addition mode for synthesizing a reading image and a stored image is selected, a time band may be set, and the addition mode may be automatically selected within this time band. In this case, steps shown in FIG. 4 are added to the flow chart shown in FIG. 2.

In FIG. 4, steps S100 to S106 are inserted between steps S68 and S70 in FIG. 2. In step S100, it is checked if a registration mode of an addition mode start time is selected. If it is determined that the registration mode is selected, the start time is registered in the register circuit 38 in step S102.

It is checked in step S104 if a registration mode of an addition mode end time is selected. If it is determined that the registration mode is selected, the end time is registered in the register circuit 40 in step S106.

Step S108 is inserted between steps S74 and S78 in FIG. 2. In step S108, it is checked if the current time exceeds the addition mode start time, and is before the addition mode end time (i.e., within the addition mode time band). If YES in step S108, the flow advances to step S78; otherwise, the flow advances to step S94.

As a condition for adding (synthesizing) stored information to reading information, when one of a condition that the addition mode lamp is ON upon depression of the addition mode lamp 34, and a condition that the current time falls within the addition mode time band is satisfied, an image synthesizing/sending operation may be performed.

A plurality of types of images (e.g., five types of images) may be stored in the memory circuit 12, and an image to be synthesized may be selected from the plurality of images. In this case, images to be written are stored in the memory circuit 12 in correspondence with code numbers (e.g., NO. 1 to NO. 5), and a user designates the code number of an image to be synthesized when he or she selects the addition mode.

The code numbers may be set in correspondence with telephone numbers of the one-touch dial keys. When a given one-touch dial key is depressed, an image having a corresponding code number may be automatically read out from the memory circuit, may be synthesized with a reading image, and the synthesized image may be sent. Thus, an image may be added depending on a distant station, or a user can arbitrarily select an additional image.

When an image stored in the memory circuit 12 is to be synthesized with a reading image in the addition mode, sending source information (a date, a user's abbreviation, a telephone number, and the like) as fixed information, and an image stored in the memory circuit 12 may be synthesized with a reading image. Furthermore, in the addition mode, a selection button for arbitrarily selecting whether or not the sending source information is added may be arranged, and the sending source information may be added upon manual selection using the selection button.

The second embodiment of the present invention will be described below. In this embodiment, a plurality of types of images are stored as images to be added, an image to be synthesized is selected from the plurality of types of images, the selected image is synthesized with an original image, and the synthesized image is sent.

Figure 5B:
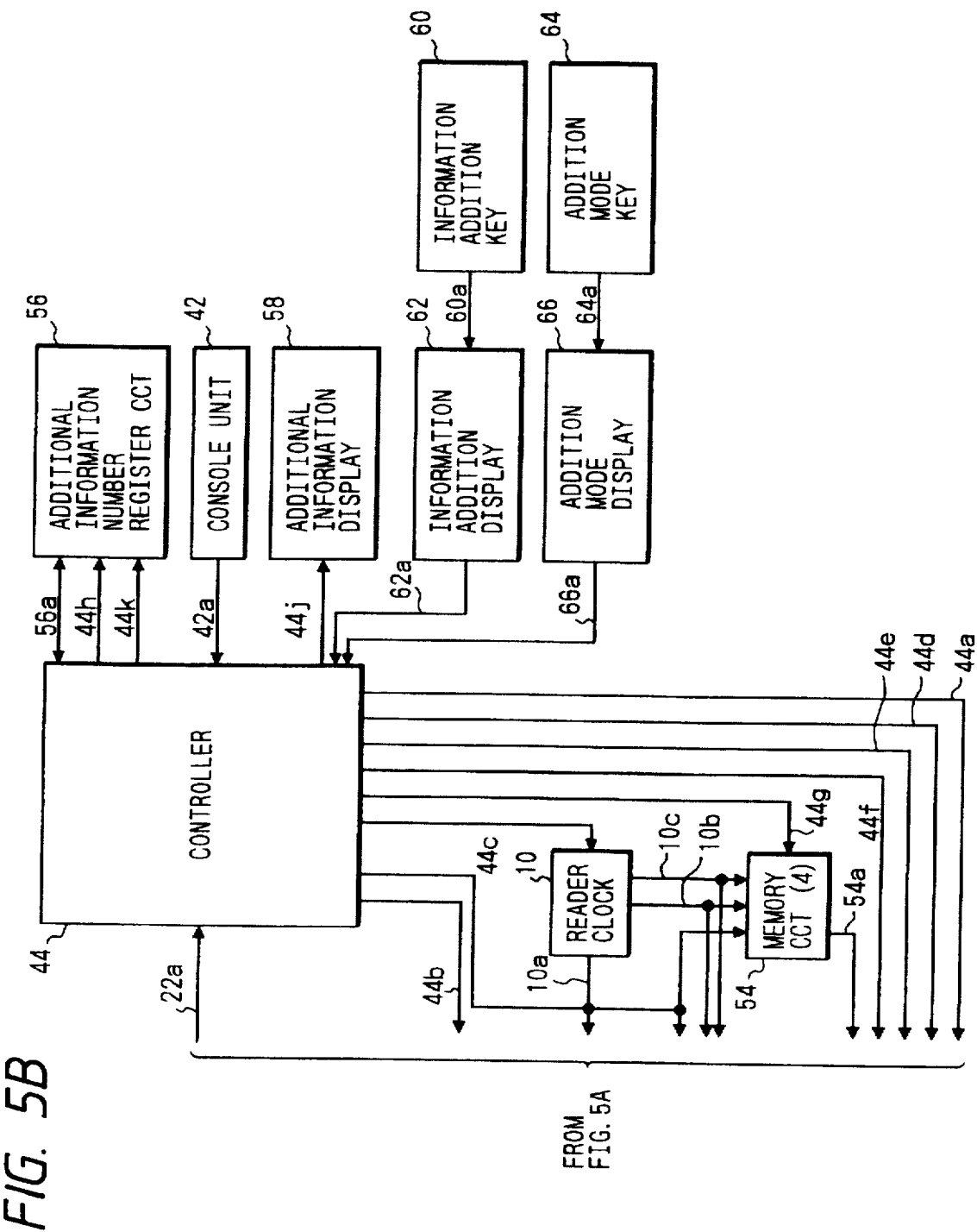

FIG. 5 is a block diagram showing an arrangement of the facsimile apparatus according to the second embodiment. The same reference numerals in FIG. 5 denote the same parts as in FIG. 1, and a detailed description thereof will be omitted.

In FIG. 5, memory circuits 48, 50, 52, and 54 are arranged, and respectively store first additional information, second additional information, third additional information, and fourth additional information. One of the memory circuits is selected by a control signal 44d, 44e, 44f, or 44g from a controller 44, and the selected additional information is synthesized with an original image by an adder 46.

An information addition button 60 is used when an image to be added is stored in one of the memory circuits 48, 50, 52, and 54. Every time the information addition button 60 is depressed, a pulse signal is output to an information addition display (LCD) 62 through a signal line 60a.

The information addition display 62 is OFF when the power switch is turned on, and is cyclically switched to display first additional information→second additional information→third additional information→fourth additional information→OFF→first additional information, ... every time the information addition button 60 is depressed. When the display 62 displays one of the first additional information, second additional information, third additional information, and fourth additional information, it outputs one of memory selection signals "1" to "4" corresponding to the displayed additional information to the controller 44 through a signal line 62a.

An addition mode button 64 is used when an image to be added stored in one of the memory circuits 48, 50, 52, and 54 is added to a reading image. Every time the addition mode button 64 is depressed, a pulse signal is output to an addition mode display (LCD) 66 through a signal line 64a.

The addition mode display 66 is OFF when the power switch is turned on, and is cyclically switched to display first additional information→second additional information→third additional information→fourth additional information→OFF→first additional information, ... every time the addition mode button 64 is depressed. When the display 66 displays one of the first additional information, second additional information, third additional information, and fourth additional information, it outputs one of addition selection signals "1" to "4" corresponding to the displayed additional information to the controller 44 through a signal line 66a.

An addition information number register circuit 56 registers additional information numbers in correspondence with months so as to select each additional information in correspondence with a month of using the information. When an additional information number is to be registered in the register circuit 56, the controller 44 outputs data indicating a month (e.g., "02" for February) onto a signal line 56a, thereafter, outputs an additional information number to be selected, and outputs a write pulse onto a signal line 44h. When an additional information number registered in the register circuit 56 is read out, the controller 44 outputs data indicating a month (e.g., "02" for February) onto the signal line 56a, and thereafter, outputs a read pulse onto a signal line 44k. Thus, the additional information number registered in correspondence with February is output onto the signal line 56a.

A console unit 42 outputs various data such as ten-key information, one-touch dial key information, abbreviated dial key information, additional information number register key information, "*" key information, "#" key information, function key information, and the like, which correspond to keys depressed by an operator, to the controller 44.

An additional information display (LCD) 58 is an image display unit for displaying additional information selected by the addition mode button 64 on the basis of an output on a signal like 44j.

When an additional image is stored in one of the memory circuits 48, 50, 52, and 54, the information addition button 60 is depressed to select an additional information number. An original of additional information is set on an original table, and thereafter, a start button on the console unit 42 is depressed. Thus, the original of the additional information set on the original table is read, and this information is stored in the memory circuit corresponding to the selected additional information number.

In this embodiment, the additional information is defined as a maximum of one page of image information, and each memory circuit has a capacity corresponding to one page.

When the stored additional information is added to a reading original image, and the sum image is sent, the addition mode button 64 is depressed to select the addition mode. Then, an information number to be added is displayed on the addition mode display 66 on the basis of the operation of the addition mode button 64.

When the additional information number is displayed on the addition mode display 66 upon selection of a sending operation, image information stored in the memory circuit corresponding to the displayed additional information number, and reading image information are added to each other, and the sum image information is sent.

In this embodiment, when there are a plurality of originals to be sent, additional information is added to each page. As an image size to be handled, a combination of an A4 or B4 size is assumed.

When no additional information number is displayed on the addition mode display 66 upon selection of the sending operation, only reading image information is sent.

Figure 6B:
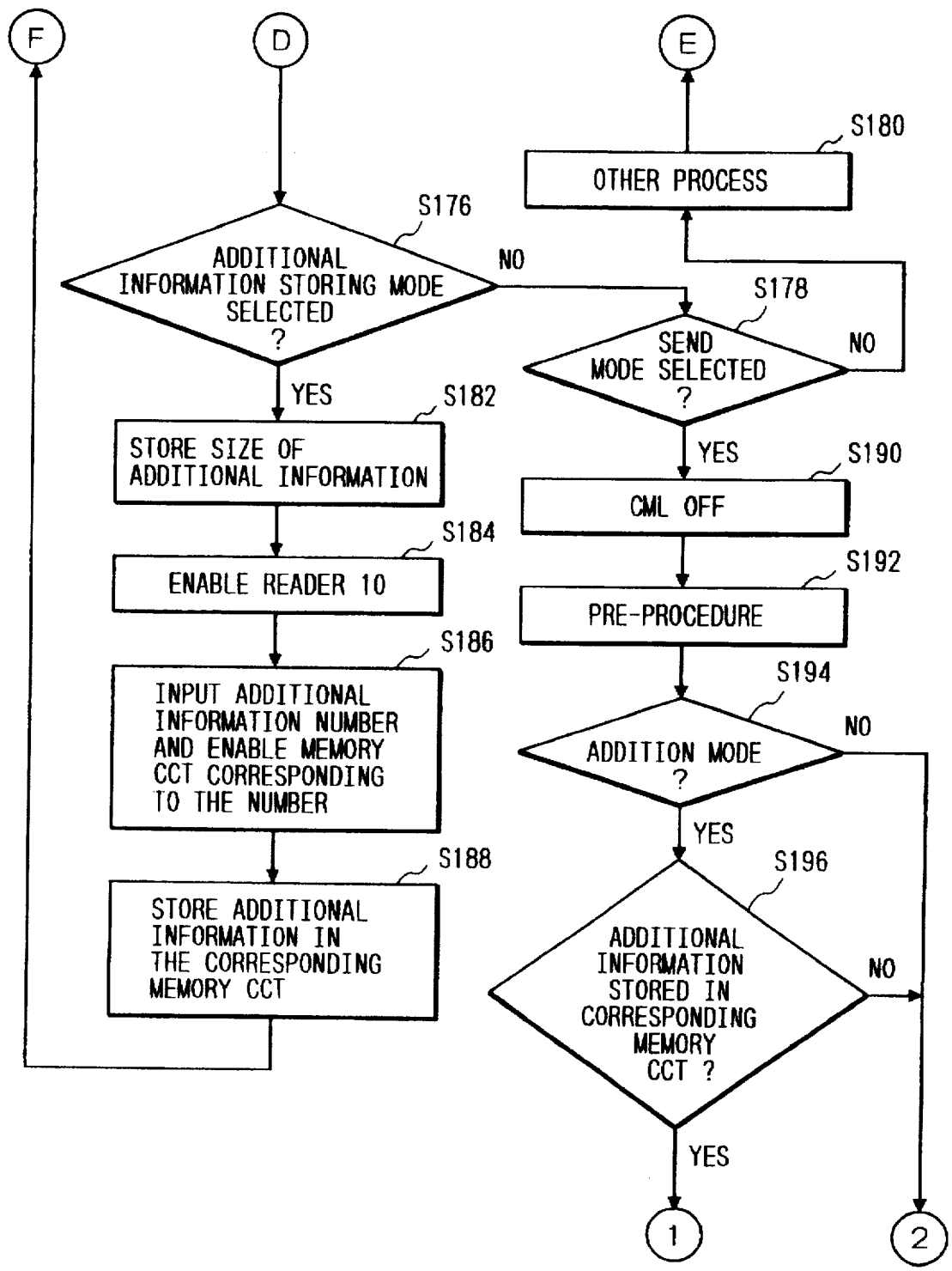
Figure 7:
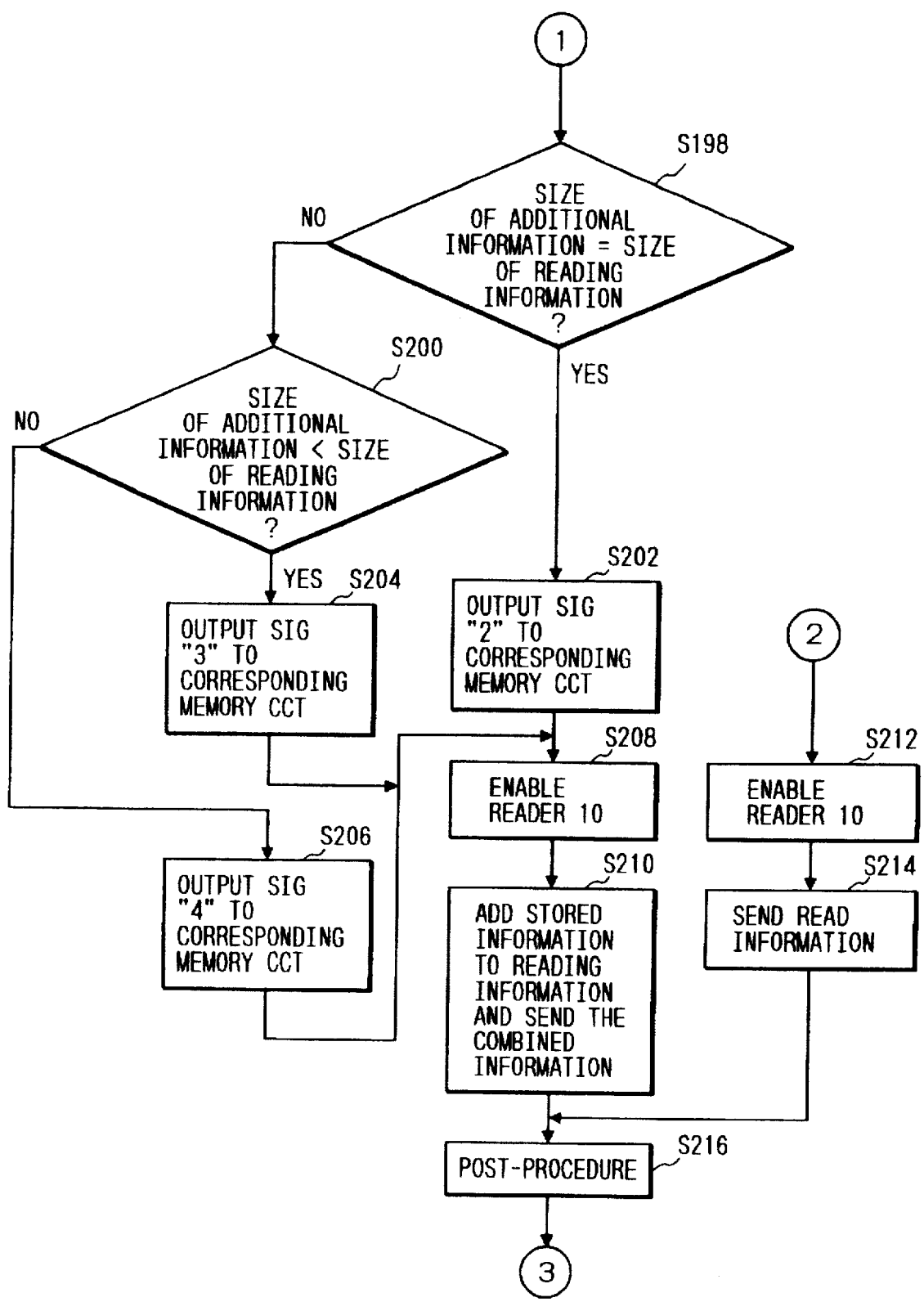
FIG. 7 is a flow chart showing another control operation of the second embodiment.

FIGS. 6 and 7 are flow charts showing a control operation in the facsimile apparatus according to the second embodiment.

The controller 44 sets the signal lines 44d to 44g at level "0" to disable the memory circuits 48, 50, 52, and 54, and sets a signal line 44c at level "0" to disable a reader 10 (steps S162 to S170).

The controller 44 sets a signal line 44a at level "0" to turn off a CML of an NCU 2 (S172), and sets the additional information display 58 to display nothing (S174).

The controller 44 monitors whether or not a storing or sending request of additional information is issued (S176 and S178). If no request is detected, the controller performs other processes (S180). For example, the controller performs processing for displaying additional information in the corresponding memory circuit on the additional information display 58 on the basis of the operation of the addition mode button 64.

The additional information storing request in step S176 is issued when an original of additional information is set on the original table, and the start button is depressed while the information addition display 62 displays an additional information number.

When the additional information storing request is issued, the controller 44 detects the size of an original set on the original table, and stores the size information in correspondence with the additional information number from the signal line 62a (S182). The controller then enables the reader 10 (S184). The controller receives the additional information number with reference to the information addition display 62, and enables the corresponding memory circuit (S186). The controller starts the reader 10, and stores the reading image data in the corresponding memory circuit (S188).

If the sending request is detected in step S178, the controller 44 sets the signal line 44a at level "1" to turn on the CML of the NCU 2 (S190). The controller then performs a pre-procedure (S192). In this procedure, the controller refers to the addition mode display 66 to check if the addition mode is selected (S194). If the addition mode is selected, the controller confirms that additional image information is stored in the memory circuit corresponding to the selected number (S196). Furthermore, the controller determines the relationship between the sizes of the additional image information and reading image information.

When the sizes of the two pieces of information are equal to each other (S198), the controller outputs a signal value "2" to the corresponding memory circuit through the signal line 66a (S202). When the size of the reading image information is larger than that of the additional image information (S200), the controller outputs a signal value "3" to the corresponding memory circuit through the signal line 66a (S204). Furthermore, when the size of the reading image information is smaller than that of the additional image information (S200), the controller outputs a signal value "4" to the corresponding memory circuit through the signal line 66a (S206).

The controller then starts the reader 10, causes the adder 46 to add the reading image information, and image information stored in the corresponding memory circuit, and sends the sum image information (S210). Upon completion of the sending operation, the controller performs a post-procedure (S216). Thereafter, the control returns to an initial state.

If it is determined in step S194 that the addition mode is not selected, or if it is determined in step S196 that no additional image information is stored in the memory circuit corresponding to the selected number, only reading image information is sent (S212 and S214).

Figure 8:
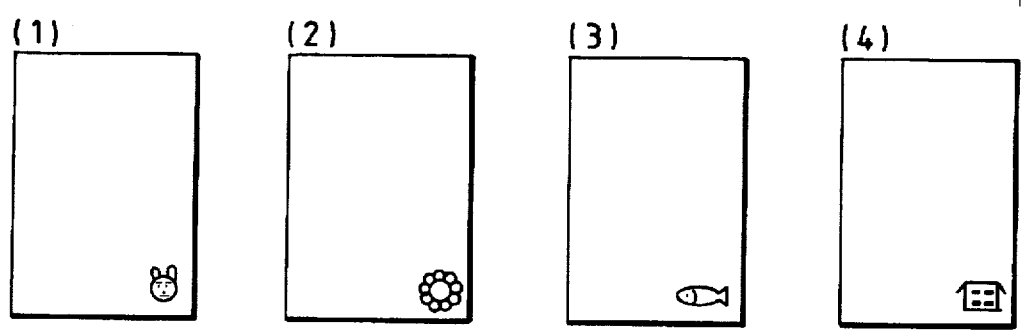
FIG. 8 is a view showing in detail additional images in the second embodiment.
Figure 9:
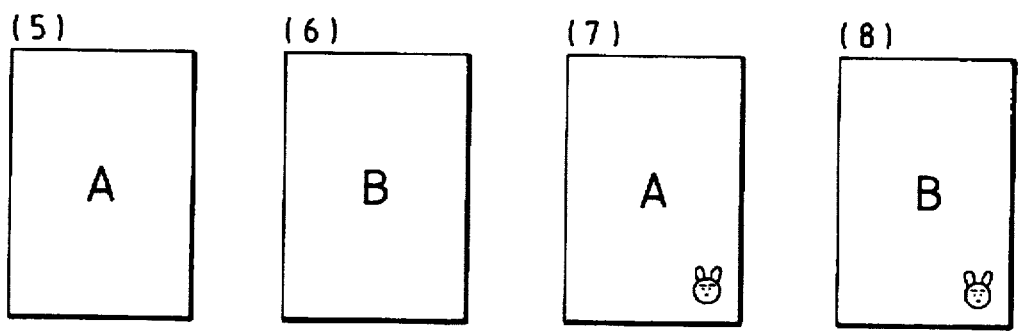
FIG. 9 is a view showing in detail read images and images to be sent in the second embodiment.

FIG. 8 is a view showing in detail additional information in the second embodiment, and FIG. 9 is a view showing in detail reading images and images to be sent.

Assume that additional images (1) to (4) shown in FIG. 8 correspond to the information numbers of the memory circuits 48, 50, 52, and 54. When the additional image (1) is added to a reading image (5) or (6), an image (7) or (8) to be sent is obtained.

Figure 10A:
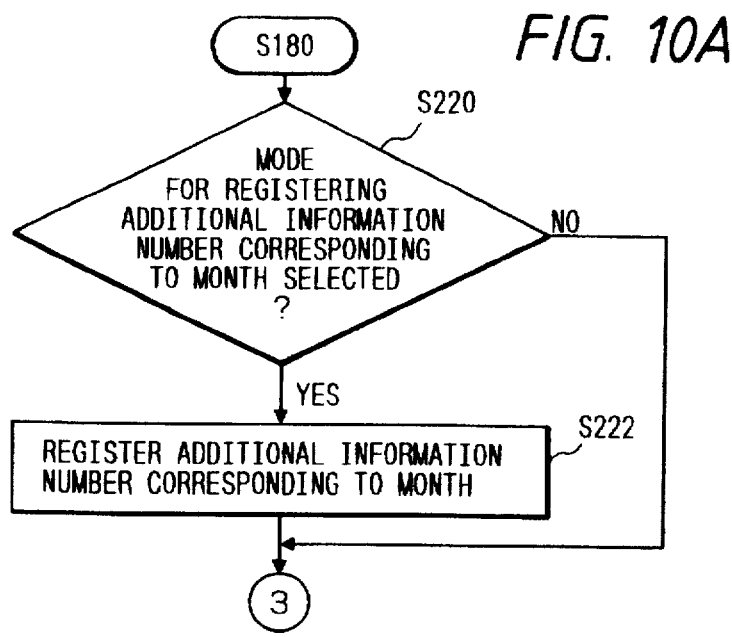
FIGS. 10A and 10B are flow charts showing a control operation according to a modification of the second embodiment.
Figure 10B:
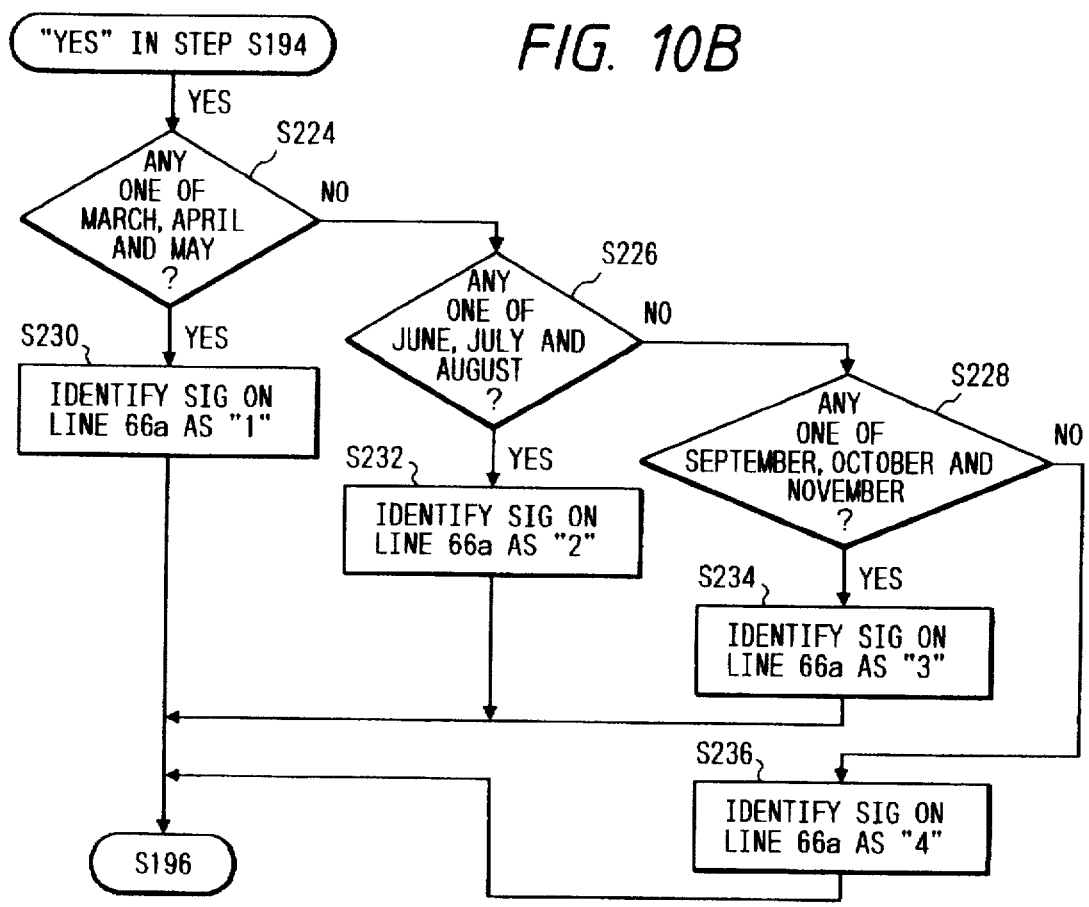

FIGS. 10A and 10B are flow charts showing a control operation according to a modification of the second embodiment.

In FIG. 10, steps common to the second embodiment are omitted.

In this modification, an additional information number is changed depending on a month by utilizing the additional information number register circuit 56. For example, when the current month is one of March to May, the first additional information is added; when one of June to August, the second additional information is added; when one of September to November, the third additional information is added; and when one of December, January, and February, the fourth additional information is added.

In FIG. 10A, in other processes (S180) shown in FIG. 6, it is checked if a mode for registering an additional information number in correspondence with a month is selected (S220). If the mode is selected, a registration operation is performed by utilizing the additional information number register circuit 56 (S222). Selection in step S220 can be attained by, e.g., a function key input. The registration operation in step S222 is performed using, e.g., the ten-key pad.

In FIG. 10B, when the processing in the addition mode is performed in step S194 in FIG. 6, the current month is determined (steps S224 to S228), and additional information according to the current month is selected (steps S230 to S236). In step S196 and subsequent steps in FIG. 6, processing for adding the selected information to reading information, and sending the sum information is performed.

In the above description, the four additional information memory circuits are arranged. However, the present invention is not limited to this. In the above embodiment, a piece of additional information is added to each piece of reading information. However, a plurality of pieces of additional information may be added.

The third embodiment of the present invention will be described below. In this embodiment, when stored additional information is synthesized with an original image, an operator can designate a synthesizing area.

Figure 11B:
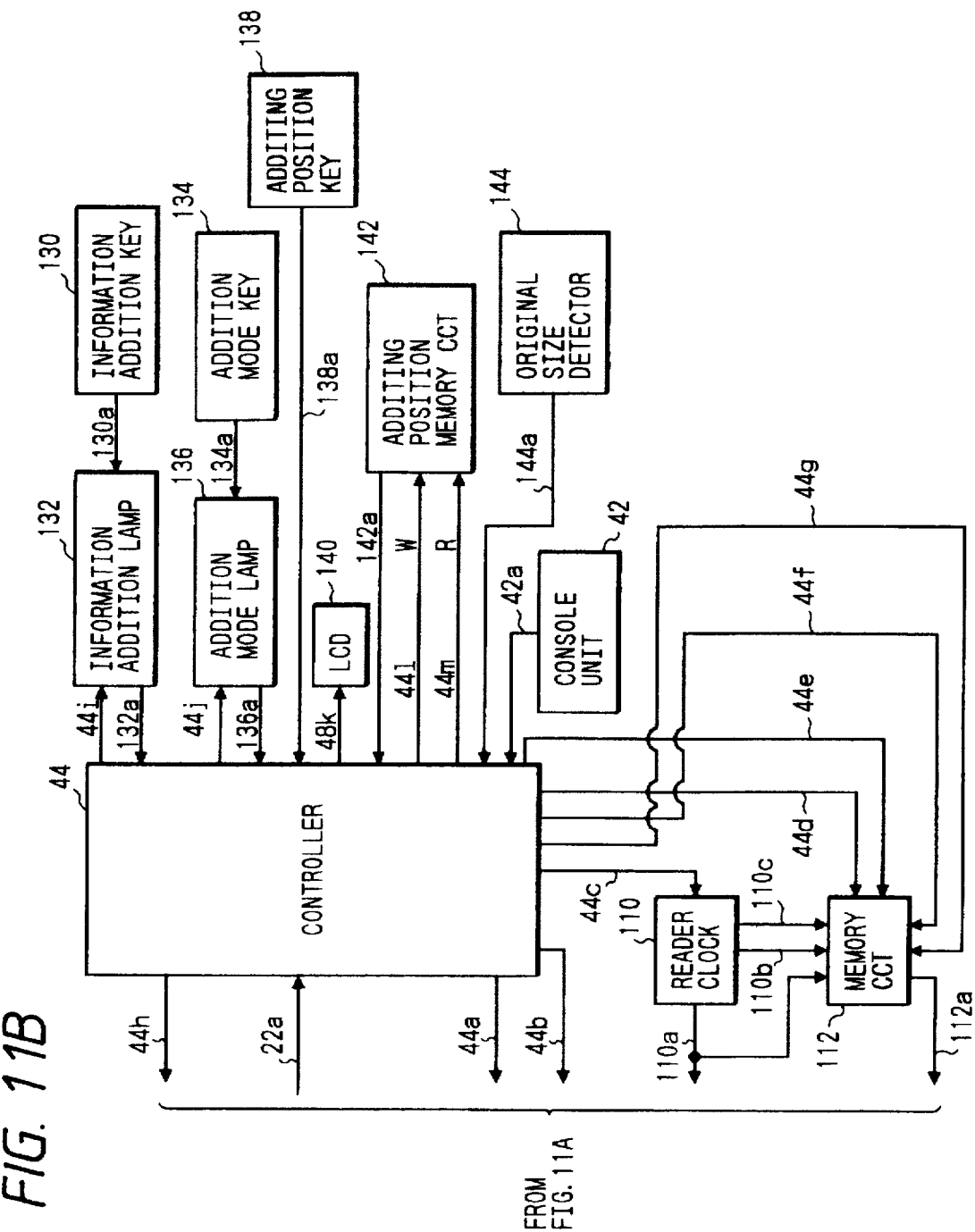

FIG. 11 is a block diagram showing an arrangement of a facsimile apparatus of the third embodiment. The same reference numerals in FIG. 11 denote the same parts as in FIG. 1, and a detailed description thereof will be omitted.

A reader 110 sequentially reads an image signal for one main scanning line from an original to be sent when a signal of signal level "1" is output onto a signal line 44c, and forms a signal string representing binary values, i.e., "black" and "white". The reader 110 comprises an image pickup device such as a CCD (charge-coupled device), and an optical system. The binary signal string of "black" and "white" is output onto a signal line 110a. In this case, 216×8 (bit) data is output onto a signal line 110a for an A4 original, and 256×8 (bit) data is output onto the signal line 110a for a B4 original. The reader 110 outputs data transfer clocks onto a signal line 110b when it outputs reading data onto the signal line 110a. The reader 110 generates a line pulse onto a signal line 110c prior to transfer of one-line reading data. The reader 110 is disabled when a signal of signal level "0" is output onto the signal line 44c.

An additional information memory circuit 112 outputs a one-line input start and end bits onto a signal line 44d. When a signal of a signal value "1" is output onto a signal line 44e, the memory circuit 112 stores line information output onto the signal line 110a from the one-line input start bit to the input end bit output on the signal line 44d on the basis of the line pulse information output onto the signal line 110c in synchronism with the data transfer clocks output onto the signal line 110b. At the same time, the memory circuit 112 stores the number of stored bits for one line, i.e., the number of bits obtained by subtracting the input start bit from the input end bit, and adding 1 to the difference. The memory circuit 112 also stores the number of stored lines. The above-mentioned operations are associated with a storing operation of a predetermined area of reading image information. A method of adding image information stored in the memory circuit 112 to currently reading image information will be described below. A bit indicating a bit position in one line of currently reading image information from which the stored information is to be output, i.e., an output start bit, is output onto the signal line 44d. When a signal of a signal value "2" is output onto the signal line 44e, the memory circuit 112 outputs, onto a signal line 112a, stored image information by the number of stored bits from the output start bit output onto the signal line 44d on the basis of the line pulse information output onto the signal line 110c in synchronism with the data transfer clocks output onto the signal line 110b.

A method of recording data stored in the memory circuit 112 will be described below. A bit indicating a bit position in one line from which stored image information is output, i.e., an output start bit, is output onto the signal line 44d. When a signal of a signal value "3" is output onto the signal line 44e, the memory circuit 112 outputs, onto the signal line 112a, stored image information by the number of stored bits from the output start bit output onto the signal line 44d on the basis of the line pulse information output onto the signal line 110c in synchronism with the data transfer clocks output onto the signal line 110b.

When a signal of a signal value "0" is output onto the signal line 44e, the memory circuit 112 is disabled.

An information addition button 130 is used when information to be added to reading information is stored in the memory circuit 112. Upon depression of the button 130, a pulse is generated onto a signal line 130a.

An information addition lamp 132 is turned off when a power switch is switched from an ON state to an OFF state. Every time a pulse is generated onto the signal line 130a, the information addition lamp 132 is repetitively turned on, off, and on. When a clear pulse is generated onto a signal line 44i, the information addition lamp is turned off. When the information addition lamp 132 is turned off, it outputs a signal of signal level "0" onto a signal line 132a; when the lamp 132 is turned on, it outputs a signal of signal level "1" onto the signal line 132a. When the information addition button 130 is depressed while the information addition lamp 132 is OFF, the information addition lamp 132 is turned on. Then, an LCD 140 (to be described later) performs a display for urging an operator to input information of a reading start position ($a_{mm}$, $b_{mm}$) of a rectangular area, which position is represented by X- and Y-distances from the upper left corner of an original, and information of a reading end position ($c_{mm}$, $d_{mm}$) of the rectangular area. The operator inputs values a, b, c, and d using the console unit 42 according to this display. The input values are displayed on the LCD 140.

An addition mode button 134 is used when information stored in the memory circuit 112 and reading information are added, and the sum information is sent. Upon depression of the button 134, a pulse is generated on a signal line 134a.

An addition mode lamp 136 is turned off when the power switch is switched from an ON state to an OFF state. Every time a pulse is generated onto the signal line 130a, the addition mode lamp 136 is repetitively turned on, off, and on. When a clear pulse is generated onto a signal line 44j, the addition mode lamp 136 is turned off. When the addition mode lamp 136 is turned off, it outputs a signal of signal level "0" onto a signal line 136a; when the lamp 136 is turned on, it outputs a signal of signal level "1" onto the signal line 136a.

A button 138 is used when a position of reading information to which information stored in the memory circuit 112 is added is registered. When the button 138 is depressed, a pulse is generated onto a signal line 138a. Then, the LCD 140 performs a display for urging an operator to input information of a synthesis start position of additional information represented by X- and Y-distances ($e_{mm}$, $f_{mm}$) from the upper left corner of an A4-size original image, and information of a synthesis start position of additional information represented by X- and Y-distances ($g_{mm}$, $h_{mm}$) from the upper left corner of a B4-size original image. The operator inputs values e, f, g, and h from the console unit 42 according to this display, and these values are stored in a memory circuit 142.

The LCD 140 is a liquid crystal display for receiving and displaying information output onto a signal line 44k.

The memory circuit 142 registers information indicating a position of reading information to which information stored in the memory circuit 112 is added. The position of additional information is separately registered for A4- and B4-size originals. As the position of additional information, a length in the X-direction (main scanning direction) from the upper left end point of reading information to the upper left end point of additional information (above-mentioned e (A4) or g (B4)), and a length in the Y-direction (subscanning direction) (above-mentioned f (A4) or h (B4)) are stored.

When information is stored, A4:e= (e.g., 160) mm and f= (e.g., 247) mm, or B4:g= (e.g., 206) mm and h= (e.g., 314) mm are output onto a signal line 142a, and thereafter, a write pulse is generated onto a signal line 44l. When the position of additional information stored in the memory circuit 142 is read out, a read pulse is generated onto a signal line 48m. Then, A4:e= (e.g., 160) mm and f= (e.g., 247) mm, or B4:g= (e.g., 206) mm and h= (e.g., 314) mm are output onto the signal line 142a.

An original size detector 144 detects the original size of an original set on an original table. When an A4-size original is set, the detector 144 outputs a signal of signal level "0" onto a signal line 144a; when a B4-size original is set, it outputs a signal of signal level "1" onto the signal line 144a.

When a predetermined area of reading information is stored in the memory circuit 112, the information addition button is depressed, and the predetermined area of reading image is input from the ten-key pad. After additional information is set on the original table, a start button is depressed. Then, the additional information set on the original table is read, and only the predetermined area of the reading information is stored in the memory circuit 112. In the case of an A4-size original, information is added from a position offset to the right by 3 mm from the input position with respect to only the main scanning direction. This is because the original size is 210 mm, and the size of information to be sent is 216 mm. In this case, information is sent in a center distributed mode.

Then, the position of reading information to which information stored in the memory circuit 112 is added is registered. After the adding position button is depressed, the adding positions are separately input for A4- and B4-size reading originals using the ten-key pad, and are stored in the memory circuit 142.

A user then selects an addition mode by depressing the addition mode button. When a sending operation is performed while the addition mode lamp is ON, information stored in the memory circuit 112 is added to the position stored in the memory circuit 142 of reading information, and the sum information is sent. The adding position varies depending on whether a reading original has an A4 or B4 size. In the case of an A4-size original, information is added from a position offset to the right by 3 mm from the position stored in the memory circuit 142 with respect to only the main scanning direction. This is because the original size is 210 mm, and the size of information to be sent is 216 mm. In this case, information is sent in a center distributed mode.

When an output operation of additional information is designated, a set recording sheet size is determined as an original size, and is stored at a designated position.

Figures 12, 12A:
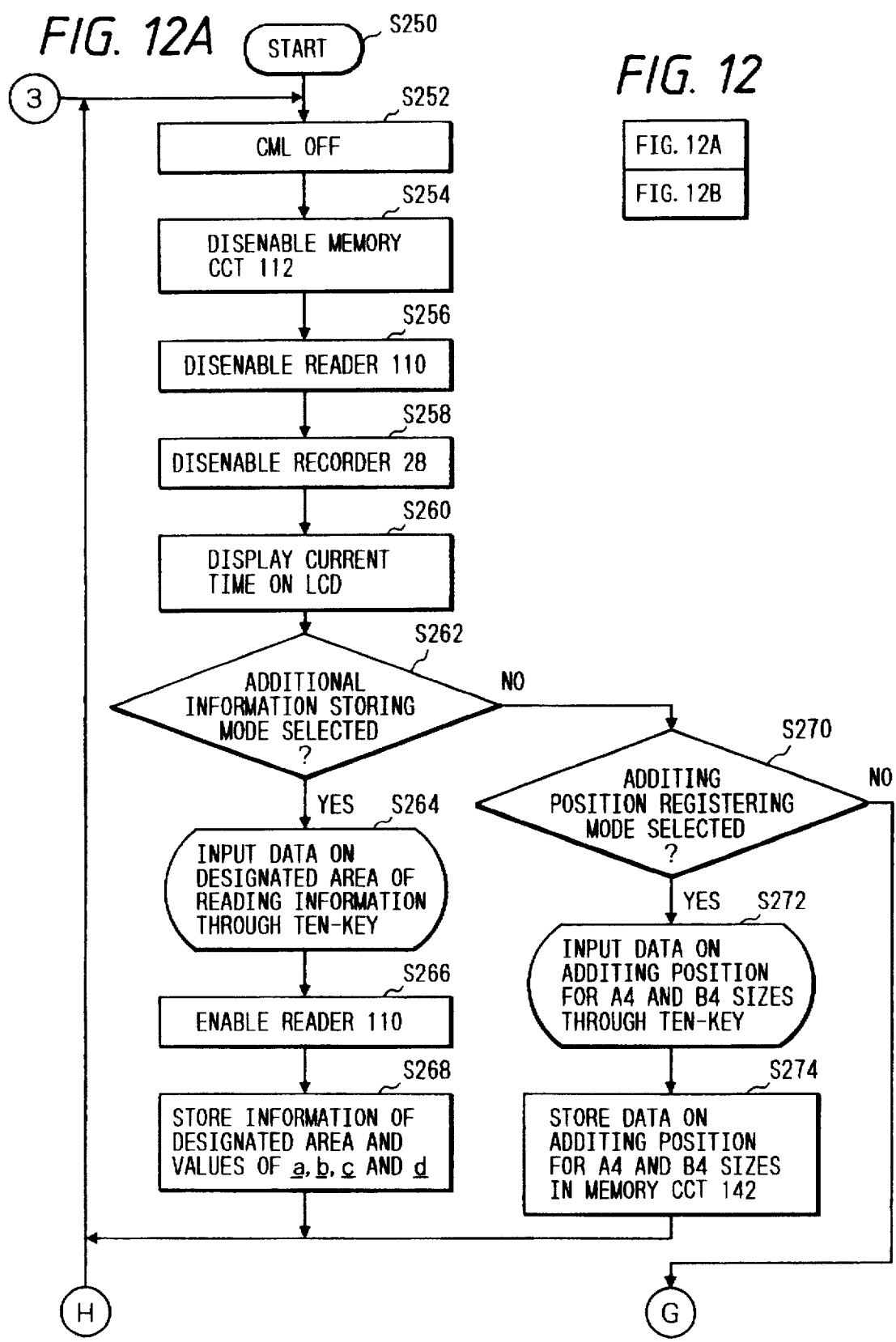
FIGS. 12 to 14, where
Figures 13, 13A:
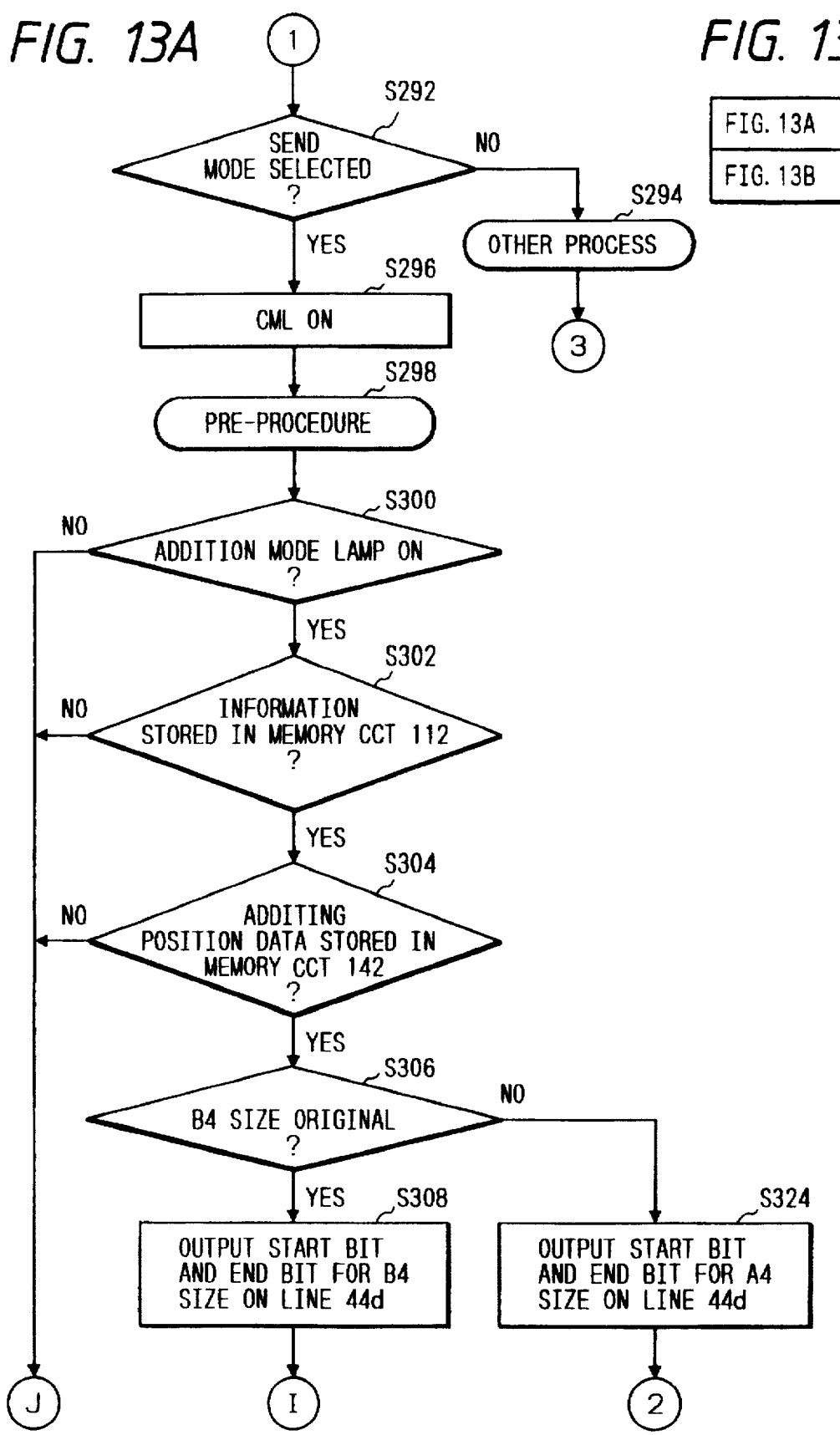
Figure 14:
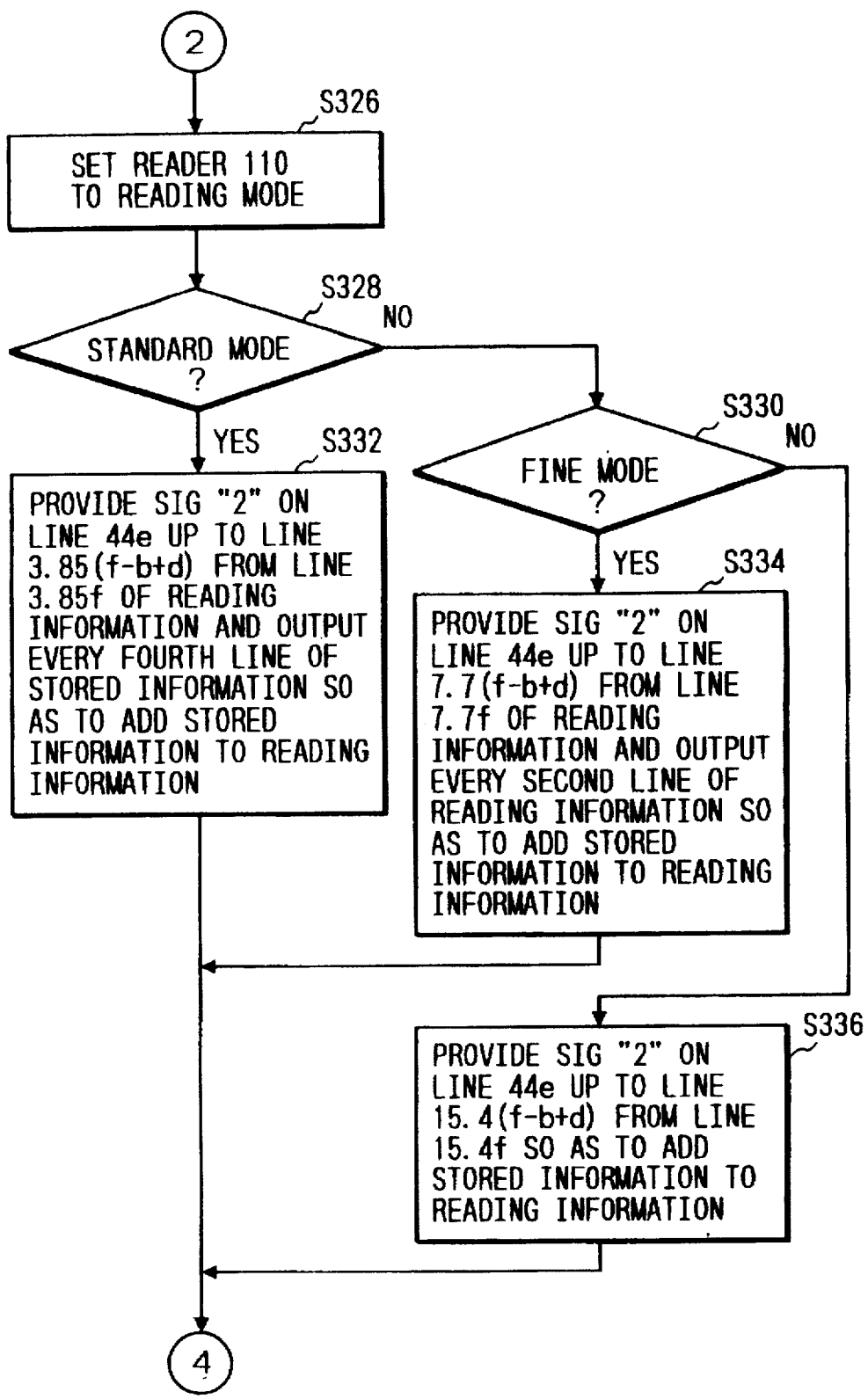

FIGS. 12 to 14 are flow charts showing a control operation of the controller 44 shown in FIG. 11.

In FIG. 12, the controller starts a control operation in step S250. In step S252, the controller outputs a signal of signal level "0" onto the signal line 44a to turn off a CML.

In step S254, the controller outputs a signal of a signal value "0" onto the signal line 44e to disable the memory circuit 112.

In step S256, the controller outputs a signal of signal level "0" onto the signal line 44c to disable the reader 110.

In step S258, the controller outputs a signal of a signal value "0" onto a signal line 44h to disable a recorder 28.

In step S260, the controller causes the LCD 140 to display a time (the current date and time) through the signal line 44k.

In step S262, the controller receives a signal on the signal line 132a, and checks if an additional information storing mode is selected. If the additional information storing mode is selected, the flow advances to step S264; otherwise, the flow advances to step S270.

When the flow advances to step S264 upon selection of the additional information storing mode, data of a storing area of reading information are input from the ten-key pad to the console unit 42. More specifically, the abovementioned values a, b, c, and d (mm) are input.

In step S266, the controller outputs a signal of signal level "1" onto the signal line 44c to start a reading operation of an original set on the original table (in a super fine mode).

In step S268, a storing start bit (a+24 bits for an A4 size; a bits for a B4 size), and a storing end bit (c+24 bits for an A4 size; c bits for a B4 size) are output onto the signal line 44d. A signal of a signal value "1" is output onto the signal line 44e for information from the (15.4b)th line to the (15.4d)th line in the super fine mode, thereby storing information of the designated predetermined area in the memory circuit 112. In addition, the values a, b, c, and d are stored.

If it is determined in step S264 that the additional information storing mode is not selected, and the flow advances to step S270, the controller receives a signal on the signal line 138a in step S270 to check if a mode for registering the adding position of the stored information to reading information is selected. If this mode is selected, the flow advances to step S272; otherwise, the flow advances to step S276.

If the mode for registering the adding position is selected, and the flow advances to step S272, the upper left end points for an A4 size (e, f) and a B4 size (g, h) of the adding position of the stored information with respect to a reading original are input from the ten-key pad of the console unit 42.

In step S274, the adding positions input in step S272 are stored in the memory circuit 142 in correspondence with the A4 and B4 sizes.

When the flow advances from step S270 to step S276, it is checked if an additional information recording mode is selected. If the additional information recording mode is selected, the flow advances to step S278; otherwise, the flow advances to step S292 in FIG. 13.

If the additional information recording mode is selected, and the flow advances to step S278, the controller outputs a signal of a signal value "2" onto the signal line 44h to set the recorder 28 in a stored information recording mode.

In step S280, it is checked if information is stored in the memory circuit 112. If the information is stored in the memory circuit 112, the flow advances to step S282; otherwise, the flow returns to step S252.

When the flow advances from step S280 to step S282, it is checked if adding position data are stored in the memory circuit 142. If the adding position data are stored in the memory circuit 142, the flow advances to step S284 to detect the recording sheet size. If an A4 size is detected, the flow advances to step S290; if a B4 size is detected, the flow advances to step S286.

In step S286, a start bit (g bits), and an end bit (g−b+d bits) are output onto the signal line 44d. In step S288, information corresponding to 15.4(d−b) lines stored in the memory circuit 112 in the super fine mode is recorded. In this case, a signal of a signal value "3" is output onto the signal line 44e.

In step S290, a start bit (e+24 bits) and an end bit (e−b+d+24 bits) are output onto the signal line 44d, and the flow then advances to step S288.

On the other hand, when the flow advances from step S276 to step S292 in FIG. 13, it is checked if a send mode is selected. If the send mode is selected, the flow advances to step S296; otherwise, other processes (step S294) are performed.

When the flow advances from step S292 to step S296, the controller outputs a signal of signal level "1" onto the signal line 44a to turn on the CML, and in step S298, a preprocedure of a facsimile communication protocol is executed.

It is then checked in step S300 if the addition mode lamp is ON. If the addition mode lamp is ON, i.e., if a mode for adding stored information to reading information, and sending the sum information is selected, the flow advances to step S302. On the other hand, if the addition mode lamp is OFF, i.e., a mode for sending only reading information is selected, the flow advances to step S338.

It is checked in step S302 if data are stored in the memory circuit 112. If the data are stored, the flow advances to step S304; otherwise, the flow advances to step S338.

In step S304, it is checked if adding position data are registered in the memory circuit 142. If the adding position data are stored, the flow advances to step S306; otherwise, the flow advances to step S338.

In step S306, it is checked if an original to be read has a B4 size. If the original has the B4 size, stored information is added to the predetermined area of the B4-size reading information, and the sum information is sent in steps S308 to S320; otherwise (A4 size), stored information is added to the predetermined area of the A4-size reading information, and the sum information is sent in steps S324 to S336.

When the flow advances to step S308 for a B4-size additional sending operation, a start bit (g bits) and an end bit (g–b+d bits) are output onto the signal line 44d, thus defining the main scanning adding position.

In step S310, the controller outputs a signal of signal level "1" onto the signal line 44c to set the reader 110 in the reading mode.

In steps S312 to S320, the additional sending operation (synthesis sending operation) of stored information to reading information is performed according to the reading mode (standard, fine, or super fine mode).

In this embodiment, information is stored in the super fine mode. For this reason, in the standard mode, a signal of a signal value "2" is output onto the signal line 44e from the (3.85h)th line to the (3.85(h–b+d))th line of reading information so as to output stored information by one line for every four lines, thereby adding the stored information to the reading information (step S316). In the fine mode, a signal of a signal value "2" is output onto the signal line 44e from the (7.7h)th line to the (7.7(h–b+d))th line of reading information so as to output stored information by one line for every two lines, thereby adding the stored information to the reading information (step S318). In the super fine mode, a signal of a signal value "2" is output onto the signal line 44e from the (15.4h)th line to the (15.4(h–b+d))th line of reading information, thereby adding the stored information to the reading information.

After the reading information and the stored information are synthesized, and the synthesized image is sent, a post-procedure of the facsimile communication protocol is executed in step S322, and the control then returns to a standby state.

When the flow advances from step S306 to step S324 for the A4-size additional sending operation, a start bit (e+24 bits) and an end bit (e–b+d+24 bits) are output onto the signal line 44d, thus defining the main scanning adding position.

In step S326 in FIG. 14, the controller outputs a signal of signal level "1" onto the signal line 44c to set the reader in the reading mode.

In steps S328 to S336, the additional sending operation (synthesis sending operation) of stored information to reading information is performed according to the reading mode (standard, fine, or super fine mode).

In this embodiment, information is stored in the super fine mode. For this reason, in the standard mode, a signal of a signal value "2" is output onto the signal line 44e from the (3.85f)th line to the (3.85(f–b+d))th line of reading information so as to output stored information by one line for every four lines, thereby adding the stored information to the reading information (step S332). In the fine mode, a signal of a signal value "2" is output onto the signal line 44e from the (7.7f)th line to the (7.7(f–b+d))th line of reading information so as to output stored information by one line for every two lines, thereby adding the stored information to the reading information (step S334). In the super fine mode, a signal of a signal value "2" is output onto the signal line 44e from the (15.4f)th line to the (15.4(f–h+d))th line of reading information, thereby adding the stored information to the reading information (step S336). Upon completion of the additional sending operation, the post-procedure in step S322 in FIG. 13 is executed, and thereafter, the control returns to a standby state.

When the flow advances from step S300 (or step S302 or S304) to step S338 to perform a normal reading/sending operation, the controller outputs a signal of signal level "1" onto the signal line 44c to set the reader 110 in the reading mode. In step S340, only normal reading information is sent. Upon completion of the sending operation of reading information, the post-procedure in step S322 is executed, and thereafter, the control returns to a standby state.

In the above embodiment, a predetermined area of additional information (stored image) is stored as raw data. However, the additional information may be encoded by, e.g., MH coding, and the encoded information may be stored. In this case, when the stored information is synthesized, it is decoded, and is then synthesized with a reading image.

As described above, according to this embodiment, image information according to a user's favor can be added to reading information, and the sum information can be sent. In addition, since only a required area of desired image information is stored, the memory capacity to be used can be reduced. In addition, since the adding position of stored information can be changed according to the original size of reading information, operability is improved.

The present invention is not limited to the above embodiments, and various changes and modifications may be made within the spirit and scope of the invention. The present invention is not limited to a facsimile apparatus, but may be applied to various other image communication apparatuses such as a TELETEX apparatus.

What is claimed is:

1. An image communication apparatus comprising:
   reading means for reading an original image;
   memory means for storing a plurality of image information;
   selecting means for selecting image information from the plurality of image information stored in said memory means;
   synthesizing means for synthesizing the image information selected by said selecting means and other image information read by said reading means; and
   sending means for sending the image information synthesized by said synthesizing means,
   wherein said selecting means selects the image information in accordance with a time when said sending means starts sending.

2. An apparatus according to claim 1, wherein said selecting means selects the image information in accordance with a transmission month.

3. An image communication method comprising:
   reading an original image using reading means;
   storing a plurality of image information;
   selecting stored image information;
   synthesizing the selected image information and other image information read by the reading means; and
   sending the synthesized image information,
   wherein said selecting step selects the image information in accordance with a time when said sending step starts sending.

4. A method according to claim 3, wherein in said selecting step, the image information is selected in accordance with a transmission month.

5. An image communication apparatus comprising:
   reading means for reading an original image;
   memory means for storing image information;
   synthesizing means for synthesizing the image information previously stored in said memory means and other image information read by said reading means; and sending means for sending image information;

instructing means for instructing a start of sending by said sending means;

control means for controlling said sending means to send image information synthesized by said synthesizing means when said instructing means instructs the start of sending within a predetermined time period, and to send image information representing the original image read by said reading means when said instructing means instructs the start of sending outside of the predetermined time period.

6. An image communication apparatus comprising:

reading means for reading an original image;

memory means for storing image information;

detection means for detecting a size of an original;

synthesizing means for synthesizing the image information previously stored in said memory means and other image information read by said reading means, said synthesizing means synthesizing the stored image information at a position on the original image in accordance with a size of the original detected by said detection means; and sending means for sending image information synthesized by said synthesizing means.

7. An image communication apparatus comprising:

reading means for reading an original image, said reading means capable of reading the original image with various resolutions;

memory means for storing a plurality of image information read by said reading means;

selecting means for selecting image information from the plurality of image information stored in said memory means;

synthesizing means for synthesizing the image information selected by said selecting means and other image information read by said reading means; and sending means for sending the image information synthesized by said synthesizing means, wherein said synthesizing means reads from said memory means image information with a resolution corresponding to a resolution with which said reading means reads the original image.

8. An apparatus according to claim 7, wherein when the image information is not stored in said memory means, said sending means sends the image information read by said reading means.

9. An image communication method comprising the steps of:

reading an original image;

storing image information;

synthesizing the image information previously stored in said storing step and other image information read by said reading step; and sending image information;

instructing a start of sending by said sending step;

controlling said sending step to send image information synthesized by said synthesizing step when in said instructing step the start of sending is instructed within a predetermined time period, and to send image information representing the original image read by said reading step when in said instructing step the start of sending is instructed outside of the predetermined time period.

10. An image communication method comprising the steps of:

reading an original image using reading means capable of reading the original image with various resolutions;

storing a plurality of image information read by said reading step;

selecting image information from the plurality of stored image information;

synthesizing the selected image information and other image information read by the reading means; and sending the synthesized image information, wherein said synthesizing step reads stored image information with a resolution corresponding to a resolution with which the reading means reads the original image.

11. An image communication method comprising the steps of:

reading an original image;

storing image information;

detecting a size of an original;

synthesizing the image information previously stored in said storing step and other image information read by said reading step, wherein in said synthesizing step, the stored image information is synthesized at a position on the original image in accordance with a size of the original detected by said detection step; and sending image information synthesized by said synthesizing step.

12. An apparatus according to any one of claims 1, 5, 6 and 7, wherein said memory means stores image information read by said reading means.

13. A method according to any one of claims 3, 9, 10 and 11, wherein in said storing step image information read by said reading step is stored.

14. An image communication apparatus comprising:

reading means for reading an original image;

memory means for storing a plurality of image information;

selecting means for selecting image information from the plurality of image information in said memory means;

synthesizing means for synthesizing the image information selected by said selecting means and other image information read by said reading means; and outputting means for outputting the image information synthesized by said synthesizing means, wherein said selecting means selects the image information in accordance with a time when said outputting means starts outputting.

15. An apparatus according to claim 14, wherein said selecting means selects the image information in accordance with a transmission month.

16. An image communication apparatus comprising:

reading means for reading an original image;

memory means for storing image information;

synthesizing means for synthesizing the image information previously stored in said memory means and other image information read by said reading means;

outputting means for outputting image information; and control means for controlling said outputting means to output image information synthesized by said synthesizing means when said outputting means outputs the image information within a predetermined time period, and to output image information representing the original image read by said reading means when said outputting means outputs the image information outside of the predetermined time period.

17. An apparatus according to claim 14 or 16, wherein said memory means stores image information read by said reading means.

18. An image communication method comprising:
reading an original image using reading means;
storing a plurality of image information;
selecting stored image information;
synthesizing the selected image information and other image information read by the reading means; and
outputting the synthesized image information,
wherein said selecting step selects the image information in accordance with a time when said outputting step starts outputting.

19. A method according to claim 18, wherein in said selecting step, the image information is selected in accordance with a transmission month.

20. An image communication method comprising the steps of:
reading an original image;
storing image information;
synthesizing the image information previously stored in said storing step and other image information read by said reading step;
outputting image information; and
controlling said sending step to output image information synthesized by said synthesizing step when, in said outputting step, the image information is outputted within a predetermined time period, and to output image information representing the original image read by said reading step when, in said outputting step, the image information is outputted outside of the predetermined time period.

21. A method according to claim 18 or 20, wherein, in said storing step, image information read by said reading step is stored.

22. An image communication apparatus comprising:
reading means for reading an original image;
memory means for storing a plurality of image information;
selecting means for selecting image information from the plurality of image information stored in said memory;
synthesizing means for synthesizing the image information selected by said selecting means and other image information read by said reading means; and
sending means for sending the image information synthesized by said synthesizing means,
wherein said selecting means selects the image information in accordance with a time when said sending means starts sending, the time corresponding to one of a month, a season, a period and a date.

23. An image communication method comprising:
reading an original image using reading means;
storing a plurality of image information;
selecting stored image information;
synthesizing the selected image information and other image information read by the reading means; and
sending the synthesized image information,
wherein said selecting step selects the image information in accordance with a time when said sending step starts sending, the time corresponding to one of a month, a season, a period and a date.

24. An image communication apparatus comprising:
reading means for reading an original image;
memory means for storing a plurality of image information;
selecting means for selecting image information from the plurality of image information stored in said memory means;
synthesizing means for synthesizing the image information selected by said selection means and other image information read by said reading means; and
outputting means for outputting the image information synthesized by said synthesizing means,
wherein said selecting means selects the image information in accordance with a time when said outputting means starts outputting, the time corresponding to one of a month, a season, a period and a date.

25. An image communication method comprising:
reading an original image using reading means;
storing a plurality of image information;
selecting stored image information;
synthesizing the selected image information and other image information read by the reading means; and
outputting the synthesized image information,
wherein said selecting step selects the image information in accordance with a time when said outputting step starts outputting, the time corresponding to one of a month, a season, a period and a date.

26. An image communication apparatus comprising:
reading means for reading an original image, said reading means capable of reading the original image with various resolutions;
memory means for storing image information read by said reading means;
selecting means for selecting image information from the image information stored in said memory;
synthesizing means for synthesizing the image information selected by said selecting means and other image information read by said reading means; and
outputting means for outputting the image information synthesized by said synthesizing means,
wherein said synthesizing means reads from said memory means image information with a resolution corresponding to a resolution with which said reading means reads the original image.

27. An image communication method comprising:
reading an original image using reading means capable of reading the original image with various resolutions;
storing image information read by said reading step;
selecting image information from the stored image information;
synthesizing the selected image information and other image information read by the reading means; and
outputting means for outputting the synthesized image information,
wherein said synthesizing step reads stored image information with a resolution corresponding to a resolution with which the reading means reads the original image.

* * * * *